(12) United States Patent
Awad et al.

(10) Patent No.: US 12,223,320 B1
(45) Date of Patent: Feb. 11, 2025

(54) FAMILY OF PROCESSORS OF DIFFERENT TYPES CONFIGURED FOR EXECUTING A COMMON INSTRUCTION SET AND METHOD FOR EXECUTING INSTRUCTIONS FROM THE COMMON INSTRUCTION SET USING A PROCESSOR OF A SPECIFIC PROCESSOR TYPE

(71) Applicant: OCTASIC INC., Montreal (CA)

(72) Inventors: Thomas Awad, Montreal (CA);
Emmanuelle Laprise, Rosemere (CA);
Stéphane Cormier, Sherrington (CA)

(73) Assignee: OCTASIC INC., Montreal (CA)

( * ) Notice: Subject to any disclaimer, the term of this patent is extended or adjusted under 35 U.S.C. 154(b) by 12 days.

(21) Appl. No.: 18/188,769

(22) Filed: Mar. 23, 2023

(51) Int. Cl.
*G06F 9/30* (2018.01)

(52) U.S. Cl.
CPC ........ *G06F 9/3001* (2013.01); *G06F 9/30036* (2013.01)

(58) Field of Classification Search
CPC .................. G06F 9/3001; G06F 9/30036
See application file for complete search history.

(56) References Cited

U.S. PATENT DOCUMENTS

| | | | | |
|---|---|---|---|---|
| 4,258,419 A * | 3/1981 | Blahut | ............... | G06F 9/30076 712/210 |
| 5,757,685 A * | 5/1998 | Ohuchi | ................... | G06F 7/575 708/518 |
| 9,684,632 B2 * | 6/2017 | Walker | ................ | G06F 15/7842 |
| 2007/0067605 A1 * | 3/2007 | Chang | ................. | G06F 15/7814 712/10 |
| 2008/0270751 A1 * | 10/2008 | Montvelishsky | ... | G06F 15/8015 712/E9.001 |
| 2011/0145543 A1 | 6/2011 | Damron | | |

* cited by examiner

*Primary Examiner* — Corey S Faherty
(74) *Attorney, Agent, or Firm* — SHERIDAN ROSS P.C.

(57) ABSTRACT

A system is provided comprising a processor part of a family of different types configured for executing a common instruction set, the processor types differing in terms of a number of multiplication units. A method for using the processor is also presented including: a. receiving a specific instruction defining a multiplication type to be applied to a first input data element and a second input data element; b. deriving a number of multiplication cycles for executing the specific instruction at least in part by processing: (i) cardinality information corresponding to the multiplication units for processor, and (ii) the multiplication type defined by the specific instruction; c. executing the specific instruction by repeatedly using the multiplication units of the processor for a number of cycles corresponding to the derived number of multiplication cycles. A method for selecting the specific processor amongst the family of processors based on one or more criteria is also presented.

23 Claims, 24 Drawing Sheets

FIG. 3A

```
Int main ()
{
    char A_matrix [Arow][Size];          ~302
    char B_matrix [Size][Bcol];          ~304
    int C_matrix [Arow][Bcol];           ~306
    Int Multiplier_No;
    Extract (multiplier_No);             ~308
    Int Get_Cycle_Number, Cycle_Size;
    Get_Cycle_Number = Arow * Bcol * Size / Multiplier_No;   ~310
    Cycle_Size = Size / Get_Cycle_Number;                    ~312
    Matrix_Multiplication (A_matrix, B_matrix, Get_Cycle_Number)
    {                                                                          ~314
        int i, j, k;
        for (i=0; i < Arow; i++)
            for (j=0; j<Bcol; j++)
                C_matrix[i][j] = 0;
        for (k=0; k < Get_Cycle_Number; k++)
        {
            for (i=0; i < Arow; i++)
            {
                for (j=0; j<Bcol; j++)
                    for (m=0; m<Cycle_Size; m++)
                    {
                        C_matrix[i][j] += A_matrix[i][m + k*Cycle_Size] * B_matrix[m + k*Cycle_Size][j];
                    }
            }
        }
    }
}
```

```
void complex_vector_mul ()
{
    complex_char A[Length];              ~302'
    complex_char B[Length];              ~304'
    complex_int C[Length];               ~306'
    Int Multiplier_No;
    Extract (multiplier_No);             ~308'
    Int Get_Cycle_Number,Cycle_Size;
    Get_Cycle_Number = Length * 4 /Multiplier_No;   ~310'
    Cycle_Size = Length / Get_Cycle_Number;         ~312'

Matrix_Multiplication (A_Cvec, B_Cvec, Get_Cycle_Number)
    {   int k, m;
        for (k=0; k < Get_Cycle_Number; k++)
        {
            for (m=0; m<Cycle_Size; m++)
            {
                C[k*Cycle_Size+m].real = A[k*Cycle_Size+m].real * B[k*Cycle_Size+m].real - A[k*Cycle_Size+m].imag * B[k*Cycle_Size+m].imag;
                C[k*Cycle_Size+m].imag = A[k*Cycle_Size+m].real * B[k*Cycle_Size+m].imag + A[k*Cycle_Size+m].imag * B[k*Cycle_Size+m].real;
            }
        }
    }
}
```

314'

$$402 \rightarrow \begin{bmatrix} a0 & \cdots & a7 \\ \cdots & \ddots & \cdots \\ h0 & \cdots & h7 \end{bmatrix}$$

FIG. 4A

$$404 \rightarrow \begin{bmatrix} i0 & \cdots & i7 \\ \cdots & \ddots & \cdots \\ p0 & \cdots & p7 \end{bmatrix}$$

| | | | |
|---|---|---|---|
| A0*B0 + A1*B4 +<br>A2*B8 + A3*B12 | A0*B1 + A1*B5 +<br>A2*B9 + A3*B13 | A0*B2 + A1*B6 +<br>A2*B10 + A3*B14 | A0*B3 + A1*B7 +<br>A2*B11 + A3*B15 |
| A4*B0 + A5*B4 +<br>A6*B8 + A7*B12 | A4*B1 + A5*B5 +<br>A6*B9 + A7*B13 | A4*B2 + A5*B6 +<br>A6*B10 + A7*B14 | A4*B3 + A5*B7 +<br>A6*B11 + A7*B15 |
| A8*B0 + A9*B4 +<br>A10*B8 + A11*B12 | A8*B1 + A9*B5 +<br>A10*B9 + A11*B13 | A8*B2 + A9*B6 +<br>A10*B10 + A11*B14 | A8*B3 + A9*B7 +<br>A10*B11 + A11*B15 |
| A12*B0 + A13*B4 +<br>A14*B8 + A15*B12 | A12*B1 + A13*B5 +<br>A14*B9 + A15*B13 | A12*B2 + A13*B6 +<br>A14*B10 + A15*B14 | A12*B3 + A13*B7 +<br>A14*B11 + A15*B15 |

$[a0, a1, a2, \ldots a7]$

FIG. 6A

$[b0, b1, b2, \ldots b7]$

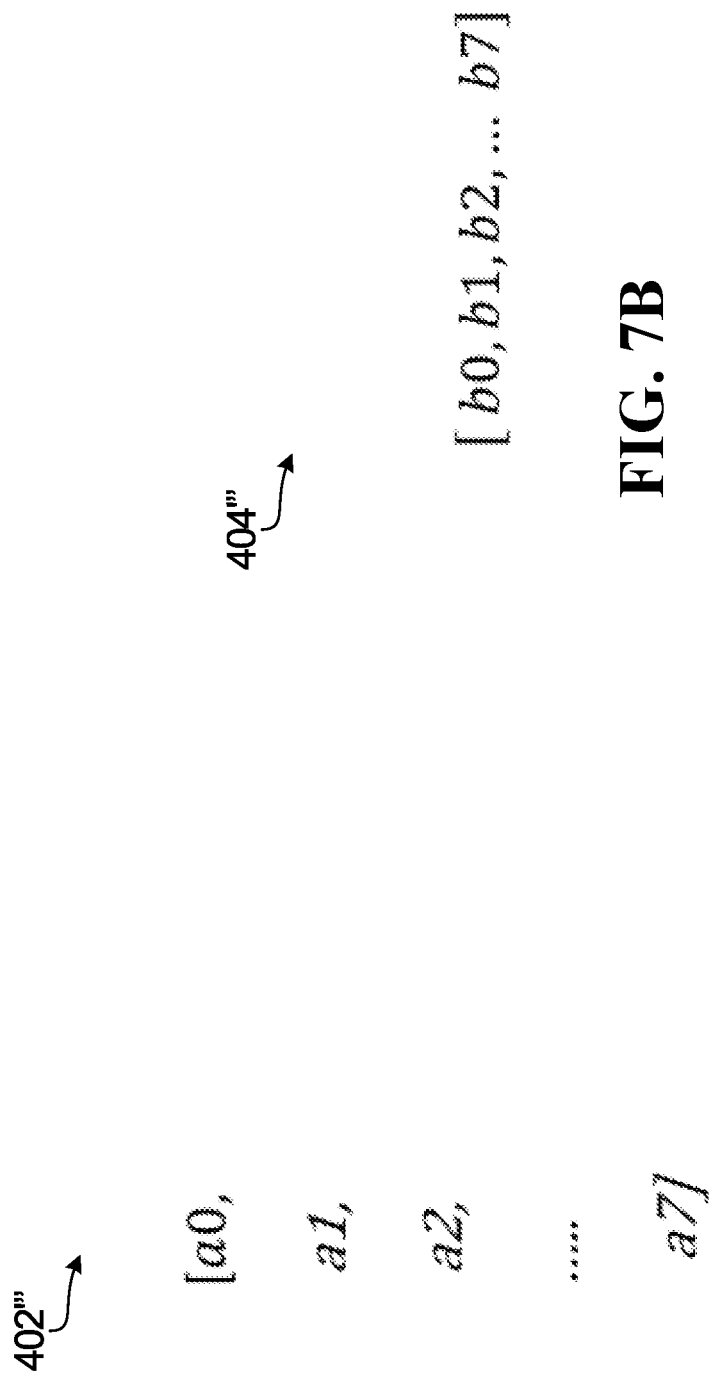

| $a0*b0$ | $a0*b1$ | $a0*b2$ | $a0*b3$ | $a0*b4$ | $a0*b5$ | $a0*b6$ | $a0*b7$ |
| --- | --- | --- | --- | --- | --- | --- | --- |
| $a1*b0$ | $a1*b1$ | $a1*b2$ | $a1*b3$ | $a1*b4$ | $a1*b5$ | $a1*b6$ | $a1*b7$ |
| $a2*b0$ | $a2*b1$ | $a2*b2$ | $a2*b3$ | $a2*b4$ | $a2*b5$ | $a2*b6$ | $a2*b7$ |
| $a3*b0$ | $a3*b1$ | $a3*b2$ | $a3*b3$ | $a3*b4$ | $a3*b5$ | $a3*b6$ | $a3*b7$ |
| $a4*b0$ | $a4*b1$ | $a4*b2$ | $a4*b3$ | $a4*b4$ | $a4*b5$ | $a4*b6$ | $a4*b7$ |
| $a5*b0$ | $a5*b1$ | $a5*b2$ | $a5*b3$ | $a5*b4$ | $a5*b5$ | $a5*b6$ | $a5*b7$ |
| $a6*b0$ | $a6*b1$ | $a6*b2$ | $a6*b3$ | $a6*b4$ | $a6*b5$ | $a6*b6$ | $a6*b7$ |
| $a7*b0$ | $a7*b1$ | $a7*b2$ | $a7*b3$ | $a7*b4$ | $a7*b5$ | $a7*b6$ | $a7*b7$ |

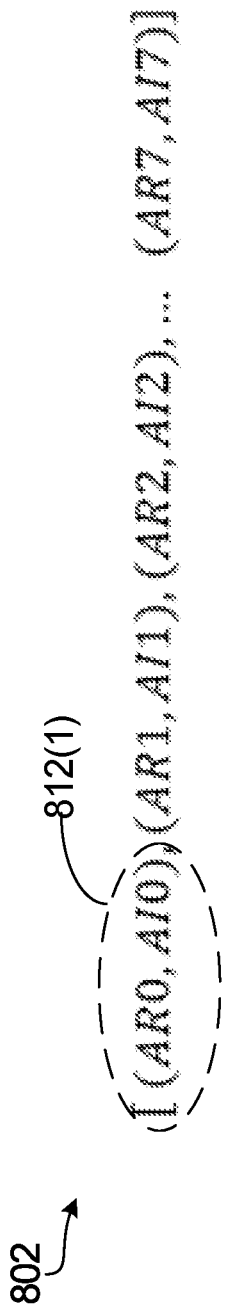
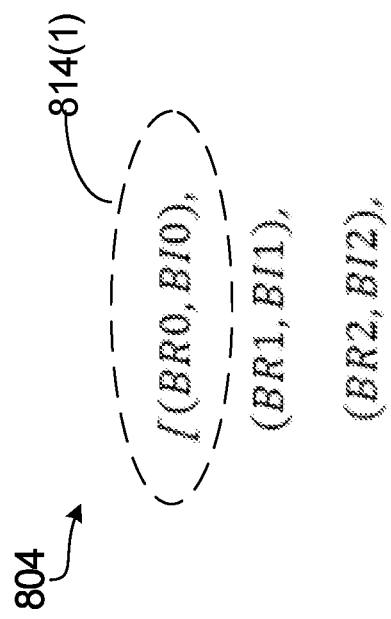
FIG. 8A
FIG. 8B

Scalar multiplication of two 128-bit vectors (16 values, 8 bits each)
*Each vector is interpreted as an array of 16 8-bit integer values.*

Vector A: | A0 | A1 | A2 | A3 | A4 | A5 | A6 | A7 | A8 | A9 | A10 | A11 | A12 | A13 | A14 | A15 |

Vector B: | B0 | B1 | B2 | B3 | B4 | B5 | B6 | B7 | B8 | B9 | B10 | B11 | B12 | B13 | B14 | B15 |

Output (256 bits): | A0 * B0 | A2 * B2 | A4 * B4 | A6 * B6 | A8 * B8 | A10 * B10 | A12 * B12 | A14 * B14 |
| A1 * B1 | A3 * B3 | A5 * B5 | A7 * B7 | A9 * B9 | A11 * B11 | A13 * B13 | A15 * B15 |

*The output is interpreted as an array of 16 16-bit values (since the product of two 8-bit values produces a 16-bit output. This will be contained within two 128-bit registers.*
*This operation requires 16 8-bit multiplications*

Matrix multiplication of two 128-bit vectors

Each vector is interpreted as a 4x4 matrix of 8-bit integer values.

| Vector A | A0 | A1 | A2 | A3 | A4 | A5 | A6 | A7 | A8 | A9 | A10 | A11 | A12 | A13 | A14 | A15 |
|---|---|---|---|---|---|---|---|---|---|---|---|---|---|---|---|---|

Matrix Layout A (4x4):

| A0 | A1 | A2 | A3 |
|---|---|---|---|
| A4 | A5 | A6 | A7 |
| A8 | A9 | A10 | A11 |
| A12 | A13 | A14 | A15 |

| Vector B | B0 | B1 | B2 | B3 | B4 | B5 | B6 | B7 | B8 | B9 | B10 | B11 | B12 | B13 | B14 | B15 |
|---|---|---|---|---|---|---|---|---|---|---|---|---|---|---|---|---|

Matrix Layout B:

| B0 | B1 | B2 | B3 |
|---|---|---|---|
| B4 | B5 | B6 | B7 |
| B8 | B9 | B10 | B11 |
| B12 | B13 | B14 | B15 |

Matrix multiplication defines each output value as the dot product of the appropriate row from matrix A by the appropriate column of matrix B Output (256 bits):

| A0*B0 + A1*B4 + A2*B8 + A3*B12 | A0*B1 + A1*B5 + A2*B9 + A3*B13 | A0*B2 + A1*B6 + A2*B10 + A3*B14 | A0*B3 + A1*B7 + A2*B11 + A3*B15 |
|---|---|---|---|
| A4*B0 + A5*B4 + A6*B8 + A7*B12 | A4*B1 + A5*B5 + A6*B9 + A7*B13 | A4*B2 + A5*B6 + A6*B10 + A7*B14 | A4*B3 + A5*B7 + A6*B11 + A7*B15 |
| A8*B0 + A9*B4 + A10*B8 + A11*B12 | A8*B1 + A9*B5 + A10*B9 + A11*B13 | A8*B2 + A9*B6 + A10*B10 + A11*B14 | A8*B3 + A9*B7 + A10*B11 + A11*B15 |
| A12*B0 + A13*B4 + A14*B8 + A15*B12 | A12*B1 + A13*B5 + A14*B9 + A15*B13 | A12*B2 + A13*B6 + A14*B10 + A15*B14 | A12*B3 + A13*B7 + A14*B11 + A15*B15 |

The output is interpreted as an array of 16 16-bit values. Each output value is 16 bits and is the sum of four 8x8 products. This will be contained within two 128-bit registers. This operation requires 64 8-bit multiplications.

FIG. 12

Number of multiplications required, 8-bit values

|  | 128 bits | | 256 bits | | 512 bits | | 1024 bits | |
|---|---|---|---|---|---|---|---|---|
|  | Dims | # Muls | Dims | # Muls | Dims | # Muls | Dims | # Muls |
| Vector | 16x1 | 16 | 32x1 | 32 | 64x1 | 64 | 128x1 | 128 |
| Complex Vector | 8x1 | 32 | 16x1 | 64 | 32x1 | 128 | 64x1 | 256 |
| Matrix | 4x4 | 64 | 8x4 | 128 | 8x8 | 512 | 16x8 | 1024 |
| Complex Matrix | 4x2 | 64 | 4x4 | 256 | 8x4 | 512 | 8x8 | 2048 |

FIG. 13

Number of multiplications required, 16-bit values

| | 128 bits | | 256 bits | | 512 bits | | 1024 bits | |
|---|---|---|---|---|---|---|---|---|
| | Dims | # Muls | Dims | # Muls | Dims | # Muls | Dims | # Muls |
| Vector | 8x1 | 8 | 16x1 | 16 | 32x1 | 32 | 64x1 | 64 |
| Complex Vector | 4x1 | 16 | 8x1 | 32 | 16x1 | 64 | 32x1 | 128 |
| Matrix | 4x2 | 16 | 4x4 | 64 | 8x4 | 128 | 8x8 | 512 |
| Complex Matrix | 2x2 | 32 | 4x2 | 64 | 4x4 | 256 | 8x4 | 512 |

Sequence 2

- Scalar_matrix multiplication (A_matrix, B_matrix) — 1816(1)
- Scalar_matrix multiplication (A_matrix, B_matrix) — 1816(2)
- Scalar_matrix multiplication (A_matrix, B_matrix) — 1816(3)
- ...
- Scalar_matrix multiplication (A_matrix, B_matrix) — 1816(99)
- ADD(A_scalar, B_scalar) — 1814

1812

FIG. 18B

FAMILY OF PROCESSORS OF DIFFERENT TYPES CONFIGURED FOR EXECUTING A COMMON INSTRUCTION SET AND METHOD FOR EXECUTING INSTRUCTIONS FROM THE COMMON INSTRUCTION SET USING A PROCESSOR OF A SPECIFIC PROCESSOR TYPE

TECHNICAL FIELD

The present disclosure relates generally to a family of processors of different types, wherein the processors of different types in the family of processors have different capabilities, features and/or levels of performance, as well as to an instruction set common to the processors in the family of processors. The present disclosure also provides methods for executing instructions from the common instruction set using one or more specific processors in the family of processors.

BACKGROUND

As data processing requirements have inexorably grown over the years, digital signal processing (DSP) architecture design has scaled in two ways: multiplying the number of DSP cores ('multi-core') used and increasing the amount of data processed by each instruction through Single Instruction, Multiple Data (SIMD) and vector Processing. For example, vector processing, such as vector multiplications, may be efficiently implemented by increasing the number of DSPs in classic algorithms, such as Finite Impulse Response (FIR) filters or Fast Fourier Transforms (FFTs). Alternatively, an amount of data processed by each instruction is increased by implementing SIMD operations to exploit data level parallelism, which may help to reduce computing time by performing the same operation on the increased amount of data.

Of these two approaches, SIMD+Vector Processing is generally considered to be more powerful for achieving improved calculation throughputs, as it increases the amount of work performed by each instruction. Vector processing is now often considered to be the go-to approach for efficiently implementing classic algorithms such as FIR filters and FFTs that are basic building blocks of many modern applications.

Conventionally, to perform SIMD operations on a series of data, a DSP of a specific design/configuration is configured to utilize vector processing instructions that are part in an instruction set (also referred to as instruction library) that is specific to the specific design/configuration of that DSP.

In recent years, new major applications demanding high data throughputs have emerged: artificial intelligence (AI) and deep learning (DL) algorithms, which require massive amounts of data and processing. These applications have further increased the demand for high data throughputs and computational requirements because of the vast quantities of training data that need to be processed to enhance the accuracy in the search for potentially predictive relationships.

In addition to vector operations, matrix operations are also widely applied in AI algorithms. The computational burden of matrix operations, in particular matrix multiplication, relative to that of scalar operations, necessitates the use of processors with different designs and higher computational power to achieve suitable levels of performance.

While traditional DSPs used for scalar operations may be employed for matrix operations in AI applications, in order to achieve a desired AI computational performance (which is mainly influences by the performance of matrix multiplication), it is often preferable to use a DSP including a greater number of multipliers to implement instructions to accelerate the computation. For example, designers have developed AI accelerators, which are specialized processors specifically optimized for the purpose of matrix multiplication. However, since multipliers in a DSP are usually the most expensive calculation hardware in the DSP, when matrix operations are not required, applications may opt for traditional DSP designs, with fewer multipliers, to avoid a higher cost.

This presents a particular challenge for applications using a mix of scalar and matrix operations where a balance needs to be struck between cost and acceptable levels of performance. While a more expensive DSP can be used to achieve a high level of performance, the cost for doing so exclusively may not be justified. For example, in some applications where most of the operations performed are scalar operations, and matrix multiplication is rarely needed, using the more expensive DSP processing may not yield any measurable improvement in spite of the added costs. Conventional design approaches fail to provide suitable approaches for addressing such challenges.

Another challenge associated with DSP architectures is that the instruction sets used to create programs are specific to the DSP design/architecture and so the programs are not portable between different types of designs/architectures. In practice, this has the disadvantage that if a program is written using an instruction set for one architecture (e.g., a specific AI accelerator architecture), such program cannot directly be used with a traditional DSP architecture but rather must be rewritten using a different instruction set, namely an instruction set associated with the traditional DSP architecture.

In view of the foregoing, it is desirable to provide an improved family of processors, methods and systems that alleviate at least in part the above identified deficiencies.

SUMMARY

This summary is provided to introduce a selection of concepts in a simplified form that are further described below in the Detailed Description. This Summary is not intended to identify all key aspects and/or essential aspects of the claimed subject matter.

The present disclosure describes a method of executing an instruction by a processor of a specific processor type selected from a family of processor types of the type described herein. The instruction is a specific instruction from an instruction set that is common to the family of processor types. Since the instruction set is common to the family of processor types, the specific instruction may be executed by a processor of any processor type in the family of processor types. Moreover, a program comprising instructions written using the common instruction set (also referred to as common instruction library) may be executed by different processors (i.e., any processor type in the family of processor types) without needing to rewrite the program (e.g., without needing to alter the instruction set or add additional instructions). While the instruction to be executed may be of any suitable type (e.g., including, without being limited to, addition/subtraction operations, division, shift left, shift right, rotate, scalar (vector or matrix) multiplications and complex (vector or matrix) multiplications) of particular interest here are multiplication operations.

The present disclosure also describes a system (e.g., an ASIC) including processors of different processors types as described herein, wherein the processors are configured to execute instructions of a common instruction set, and wherein a specific processor type may be selected to execute an instruction sequence based on various criteria, for example including performance requirements (e.g., cycle number, the type of the instruction to be executed, computation time, efficiency, etc.) and/or hardware cost requirements amongst others.

Generally speaking, for the purpose of this disclosure, the expressions "instruction set" and "instruction library" are used interchangeably to refer to all possible instructions supported by a given set of processors. This "instruction set" and "instruction library" can be considered the "language" of the processor. In accordance with the present disclosures, each processor in a family of processors in according with specific implementations of the invention is configured to execute instructions from an "instruction set" that is common to all processors in that family of processors. Such an instruction set will be referred to as the "common instruction set" or the "common instruction library".

Also for the purpose of this disclosure, the expression "instruction sequence" is intended to refer to a sequence of ordered instructions, the instructions being selected from the common instruction set/library and being arranged to form a program to achieve a useful result. In accordance with the present disclosures, a sequence of instructions written using the common instruction may be executed by any processor in the family of processors.

Also for the purpose of this disclosure, the expression "specific instruction" is meant to refer to one individual instruction in an "instruction set/library" or from an "instruction sequence". Examples of specific instructions may include, without being limited to: a scalar vector multiplication; a complex vector multiplication; a scalar matrix multiplication; a complex matrix multiplication; an addition; a subtraction; a division; a shift left; a shift right; a rotate, amongst other possible operations.

According to a first aspect, a method is provided for executing instructions by a processor of a specific processor type including a different number of multiplication units. The processor is configured for executing a common instruction set. The method comprises: a. receiving a specific instruction in the common instruction set, wherein the specific instruction defines a multiplication type to be applied to a first input data element and a second input data element, wherein the multiplication type is one of a plurality of multiplication types; b. deriving a number of multiplication cycles for executing the specific instruction using the specific processor type at least in part by processing: i. cardinality information corresponding to the multiplication units for the specific processor type, and ii. the multiplication type defined by the specific instruction; c. executing the specific instruction using the processor of the specific processor type by repeatedly using the multiplication units of the processor of the specific processor type to perform multiplications for a number of cycles corresponding to the derived number of multiplication cycles.

In some specific implementations, the method may further comprise obtaining the cardinality information corresponding to the multiplication units for the specific processor type.

In some specific implementations, deriving the number of multiplication cycles may be performed at least in part by processing: a. the cardinality information of the multiplication units, b. the multiplication type, c. first size information corresponding to the first input data element, and d. second size information corresponding to the second input data element.

In some specific implementations, the specific instruction may further define the first size information and the second size information.

In some specific implementations, the multiplication type may be one of: a scalar vector multiplication; a complex vector multiplication; a scalar matrix multiplication and a complex matrix multiplication.

In some specific implementations, the first size information corresponding to the first input data element may convey a number of R1 rows and a number of C1 columns corresponding to the first input data element; the second size information corresponding to the second input data element may convey a number of R2 rows and a number of C2 columns corresponding to the second input data element, wherein the number of C1 columns equals the number of R2 rows (C1=R2); and wherein R1, C1, R2 and C2 are integers $\geq 1$.

In some specific implementations, the multiplication type may be one of a scalar vector multiplication and a scalar matrix multiplication, and deriving the number of multiplication cycles may be performed at least in part by dividing: a result of multiplying the number of R1 rows, the number of C1 columns, and the number of C2 columns; by the cardinality information of the multiplication units.

In some specific implementations, the multiplication type may be one of a complex vector multiplication and a complex matrix multiplication and deriving the number of multiplication cycles may be performed at least in part by dividing: a result of multiplying 4, the number of R1 rows, the number of C1 columns, and the number of C2 columns (4*R1*C1*C2); by the cardinality information of the multiplication units.

In some specific implementations, the multiplication type may be the scalar vector multiplication, wherein each of the first input data element and the second input data element is a scalar vector and wherein: the number of R1 rows is an integer >1; the number of C1 columns is equal to 1; and the number of C2 columns is an integer >1.

In some other specific implementations, the multiplication type may be the scalar vector multiplication, wherein each of the first input data element and the second input data element is a scalar vector and wherein: the number of R1 rows is equal to 1; the number of C1 columns is an integer >1; and the number of C2 columns is equal to 1.

In yet some other specific implementations, the multiplication type may be the scalar matrix multiplication, wherein each of the first input data element and the second input data element is a scalar matrix and wherein: the number of R1 rows is an integer >1; the number of C1 columns is an integer >1; and the number of C2 columns is an integer >1.

In some specific implementations, the multiplication type may be the complex vector multiplication, each of the first input data element and the second input data element being a complex vector and: the number of R1 rows being an integer >1; the number of C1 columns being equal to 1; and the number of C2 columns being an integer >1.

In some specific implementations, the multiplication type may be the complex vector multiplication, wherein each of the first input data element and the second input data element is a complex vector and wherein: the number of R1 rows is equal to 1; the number of C1 columns is an integer >1; and the number of C2 columns is equal to 1.

In some specific implementations, the multiplication type may be the complex matrix multiplication, each of the first input data element and the second input data element is a complex matrix and wherein: the number of R1 rows is an integer >1; the number of C1 columns is an integer >1; and the number of C2 columns is an integer >1.

In some specific implementations, the processor of the specific processor type is part of a family of processor types each of which includes a different number of multiplication units, wherein processors associated with the family of processor types are configured for executing the common instruction set.

In some specific implementations, the processors associated with the family of processor types may be digital signal processors (DSPs).

In some specific implementations, the processors associated with the family of processor types may include $2^M*N$ multiplication units, wherein N is an integer ≥1 and M is an integer ≥0 and wherein: N is a same value for all processor types in the family of processor types; and M is different for each processor type in the family of processor types.

According to another aspect, a method is provided for executing an instruction sequence using a processing system. The processing system includes a first processor of a first processor type and a second processor of a second processor type. The first processor type corresponds to first cardinality information conveying a number of multiplication units in the first processor type, and the second processor type corresponds to second cardinality information conveying a number of multiplication units in the second processor type. The second cardinality information is greater than the first cardinality information. The first processor and the second processor are part of a same family of processor types and are configured for executing instructions from a common instruction library. The instruction sequence is written using the common instruction library and includes at least one specific instruction defining a multiplication type. The method comprises: (a) processing the instruction sequence in combination with the first cardinality information to derive a first length of execution indicator associated with the first processor, the first length of execution indicator conveying an expected execution period for executing at least part of the instruction sequence using the first processor; (b) processing the instruction sequence in combination with the second cardinality information to derive a second length of execution indicator associated with the second processor, the second length of execution indicator conveying an expected execution period for executing at least part of the instruction sequence using the second processor; (c) processing the derived first length of execution indicator and the derived second length of execution indicator to derive a performance improvement indicator conveying a level of improvement between using the second processor relative to using the first processor; (d) selecting a specific processor amongst the first processor and the second processor at least in part based on the performance improvement indicator; (e) executing the instruction sequence using the selected specific processor.

In some specific implementations, the instruction sequence may include any number of individual instructions arranged to form a program, wherein the instructions may be of any suitable type (e.g., including, without being limited to, addition/subtraction operations, division, shift left, shift right, rotate, scalar (vector or matrix) multiplications and complex (vector or matrix) multiplications).

In some specific implementations, selecting the specific processor amongst the first processor and the second processor may include: a) comparing the derived performance improvement indicator to a minimum performance improvement threshold; b) in absence of the derived performance improvement indicator meeting the minimum performance improvement threshold, selecting the first processor as the specific processor for executing the instruction sequence; c) in response to the derived performance improvement indicator meeting the minimum performance improvement threshold, selecting the second processor as the specific processor for executing the instruction sequence.

In some specific implementations, selecting the specific processor amongst the first processor and the second processor may be performed at least based on the performance improvement indicator in combination with one or more other factors, wherein the one or more other factors include at least one of a system load level, a power consumption level, and latency requirements.

In some specific implementations, the minimum performance improvement threshold may be at least 10%, at least 20%, at least 50%, at least 70%, at least 75% or more.

In some specific implementations, processing the instruction sequence in combination with the first cardinality information to derive the first length of execution indicator may include: a) for each instruction in the instruction sequence defining a multiplication type, deriving a number of multiplication cycles for executing the instruction using the first processor in part by processing: i) the first cardinality information, and ii) the multiplication type defined by the specific instruction; b) using the numbers of multiplication cycles derived in a) in combination with a number of cycles needed to execute instructions other than instructions defining multiplication types in the instruction sequence to derive the first length of execution indicator.

In some specific implementations, processing the instruction sequence in combination with the second cardinality information to derive the second length of execution indicator may include: a) for each instruction in the instruction sequence defining a multiplication type, deriving a number of multiplication cycles for executing the instruction using the second processor in part by processing: i) the second cardinality information, and ii) the multiplication type defined by the specific instruction; b) using the numbers of multiplication cycles derived in a) in combination with a number of cycles needed to execute instructions other than instructions defining multiplication types in the instruction sequence to derive the second length of execution indicator.

In some specific implementations, processors in the same family of processor types may include $2^M*N$ multiplication units, wherein N is an integer ≥1 and M is an integer ≥0 and wherein: a) N is a same value for all processor types in the same family of processor types; and b) M is different for each processor type in the same family of processor types.

In some specific implementations, the method may include obtaining the first cardinality information and the second cardinality information.

In some specific implementations, each one of the first processor and the second processor may include an arithmetic calculation unit with a same design as other processors in the same family of processor types.

In some specific implementations, the first processor and the second processor may be integrated in an application specific integrated circuit (ASIC).

In some specific implementations, the number of multiplication units in the first processor type may be N and the number of multiplication units in the second processor type may be $2^M*N$, wherein N and M are integers ≥1.

In accordance with yet another aspect, a system comprising a processor of a specific processor type selected from a family of processor types each of which includes a different number of multiplication units is provided. Processors associated with the family of processor types are configured for executing a common instruction set. The processor of the system is of a first processor type and the family of processor types includes at least a second processor type distinct from the first processor type. The processor of the system comprises: a. a first arithmetic calculation unit sharing a common design with arithmetic calculation unit in processors corresponding to other processor types in the family of processor types; b. a first processing control circuitry sharing a common design with processing control circuitry in processors corresponding to other processor types in the family of processor types; c. a first set of multiplication units, wherein a cardinality of the first set of multiplication units is different than cardinalities of sets of multiplication units of processors corresponding to other processor types in the family of processor types; d, wherein the first processor is configured to execute a specific instruction in the common instruction set which defines a multiplication type to be applied to a first input data element and a second input data element at least in part by executing the specific instruction including repeatedly using the first set of multiplication units to perform multiplications for a number of multiplication cycles, the number of multiplication cycles being derived at least in part by processing: i. the cardinality information of the first set of multiplication units, and ii. the multiplication type defined by the specific instruction.

In some specific implementations, the processor of the specific processor type may be integrated in an application specific integrated circuit (ASIC).

In some specific implementations, the cardinality of the first set of multiplication units may be N and the cardinality of another set of multiplication units corresponding to the processor types in the family of processor types may be $2^M*N$, wherein N and M are integers $\geq 1$.

In some specific implementations, the processor of the specific processor type may be a digital signal processor (DSP).

In some specific implementations, the processor of the first specific processor type may be a first processor, the system comprising a plurality of processors each of which may be associated with a respective processor type selected from the family of processor types, the plurality of plurality of processors including the first processor and at least a second processor of a second processor type, the first processor type being different from the second processor type.

In some specific implementations, the plurality of processors may be digital signal processors (DSP).

In some specific implementations, the first processor of the first processor type and the second processor of the second processor type may be integrated in an application specific integrated circuit (ASIC).

In some specific implementations, the cardinality of the first set of multiplication units may be N and the cardinality of another set of multiplication units corresponding to the second processor type may be $2^M*N$, wherein N and M are integers $\geq 1$.

In accordance with a fourth aspect, a set of processors corresponding to two or more different processor types in a family of processor types are provided. The different processor types in the family of processor types include different numbers of multiplication units. The processors in the set of processors are configured for executing a common instruction set including a plurality of multiplication types, wherein using a specific processor in the set of processors to execute a specific instruction from the common instruction set defining a multiplication type includes using multiplication units corresponding to the specific processor to perform multiplications for a number of cycles corresponding to a number of multiplication cycles, wherein the number of multiplication cycles is derived at least in part by processing cardinality information of the multiplication units of the specific processor and the multiplication type defined by the specific instruction.

In accordance with another aspect, a non-transitory computer-readable medium having instructions tangibly stored thereon is provided. The instructions are written using an instruction set configured to be executed by processors of two or more different types selected in the family of processor types, when executed, said instructions causing the system described herein to implement the method described herein.

In accordance with another aspect, a non-transitory computer-readable medium having instructions tangibly stored thereon is provided. The instructions are written using an instruction set configured to be executed by processors of two or more different types selected in the family of processor types, when executed, said instructions causing the system described herein to implement the method described herein.

In accordance with another aspect, a system is provided. The system comprises: a processor configured to execute a specific instruction in a common instruction set which defines a multiplication type to be applied to a first input data element and a second input data element at least in part by executing the specific instruction including repeatedly using a set of multiplication units to perform multiplications for a number of multiplication cycles, the number of multiplication cycles being derived at least in part by processing: i. cardinality information of the set of multiplication units, and ii. the multiplication type defined by the specific instruction.

All features of exemplary embodiments which are described in this disclosure and are not mutually exclusive can be combined with one another. Elements of one embodiment or aspect can be utilized in the other embodiments/aspects without further mention. These and other aspects of this disclosure will now become apparent to those of ordinary skill in the art upon review of a description of embodiments that follows in conjunction with accompanying drawings.

BRIEF DESCRIPTION OF THE DRAWINGS

Reference will now be made, by way of example, to the accompanying drawings which show example embodiments of the present application, and in which:

FIG. 3A is a schematic diagram of pseudo code that may be written using the common instruction library 116 shown FIG. 1A in accordance with a non-limiting implementation, the pseudo code including a scalar matrix multiplication operation 314, the pseudo code being executable by processors of different types in the family of processor types;

FIG. 3B is a schematic diagram of pseudo code that may be written using the common instruction library 116 shown FIG. 1A in accordance with a non-limiting implementation, the pseudo code including a complex matrix multiplication operation 314', the pseudo code being executable by processors of different types in the family of processor types;

FIGS. 4A-4B show examples of two input matrices each of which is an 8×8 scalar matrix that may be input into the scalar multiplication operation 314 of FIG. 3A;

FIGS. 5A-5B show an alternative example of two input matrices each of which is a 4×4 scalar matrix that may be input into the scalar multiplication operation 314 of FIG. 3A;

FIG. 5C is a schematic diagram of an output that may be generated by inputting the two input matrices of FIGS. 5A-5B into the scalar multiplication operation 314 of FIG. 3A;

FIGS. 6A-6B show an example of two input vectors one of which is an 1×8 scalar vector (FIG. 6A), and the other one of which is an 8×1 scalar vector (FIG. 6B) that may be input into the scalar multiplication operation 314 of FIG. 3A;

FIG. 6C is a schematic diagram of an output that may be generated by inputting the two input vectors of FIGS. 6A-6B into the scalar multiplication operation 314 of FIG. 3A;

FIGS. 7A-7B show an alternative example of two input vectors one of which is an 8×1 scalar vector (FIG. 7A), and the other one of which is an 1×8 scalar vector (FIG. 7B), that are input into the scalar multiplication operation 314 of FIG. 3A;

FIG. 7C is a schematic diagram of an output that may be generated by inputting the two input vectors of FIGS. 7A-7B into the scalar multiplication operation 314 of FIG. 3A;

FIGS. 8A-8B show an alternative example of two input vectors one of which is an 1×8 complex vector (FIG. 8A), and the other one of which is an 8×1 complex vector (FIG. 8B) that are input into a complex vector multiplication operation 314' of FIG. 3B, in accordance with an embodiment of the invention;

FIG. 10 is a schematic diagram illustrating a scalar vector multiplication operation between two vectors;

FIG. 12 is a schematic diagram illustrating a scalar matrix multiplication operation between two scalar matrices;

FIG. 13 is a schematic diagram illustrating different numbers of multipliers required for different multiplication operations between two inputs, each input being comprised of 8-bit values;

FIG. 14 is a schematic diagram illustrating different numbers of multipliers required for different multiplication operations between two inputs, each input being comprised of 16-bit values;

FIGS. 15, 16 and 17 are schematic diagrams of a family of processors of (3) processor types configured for executing a common instruction set in accordance with an embodiment of the invention, wherein FIG. 15 shows a processor of a first processor type having 16 8-bit multipliers; FIG. 16 shows a processor of a second processor type having 32 8-bit multipliers; and FIG. 17 shows a processor of a third processor type having 64 8-bit multipliers.

FIG. 18B is a schematic diagram illustrating an alternative example of the instruction sequence 122' that may be written by using the common instruction library 116' of FIG. 1B, in accordance with an alternative embodiment of the invention;

Similar reference numerals may have been used in different figures to denote similar components.

Figure 1A:
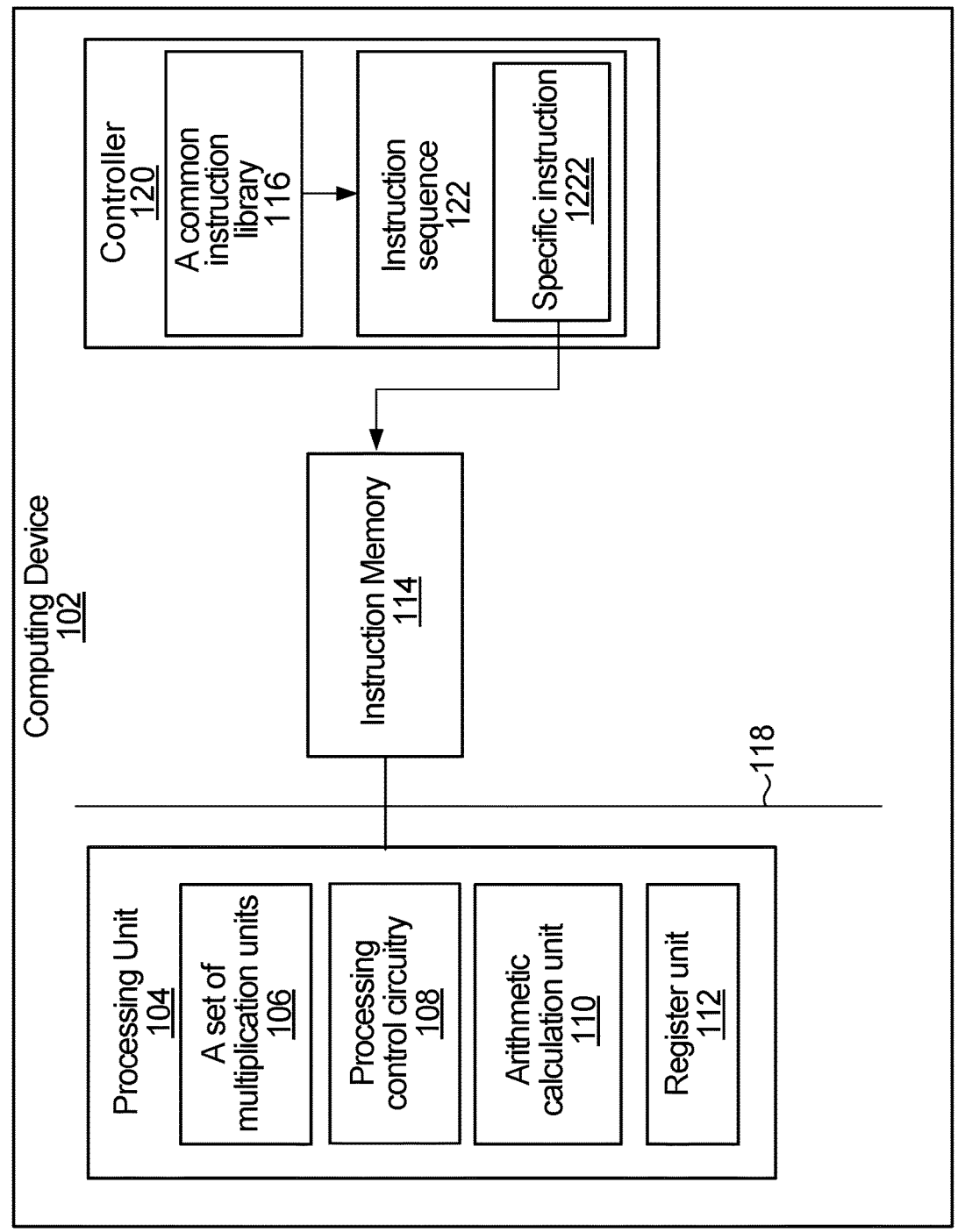
FIG. 1A is a block diagram illustrating a system including a processor of a specific processor type configured for executing a specific instruction written using an instruction set that is common for a family of processor types, the different processor types in the family of processor types including different numbers of multiplication units, in accordance with a first embodiment of the invention.

In the drawings, embodiments are illustrated by way of example. It is to be expressly understood that the description and drawings are only for purposes of illustrating certain embodiments and are an aid for understanding. They are not intended to be a definition of the limits of the invention.

DESCRIPTION OF SPECIFIC EMBODIMENTS

The present disclosure is made with reference to the accompanying drawings, in which certain embodiments are shown. However, the description should not be construed as limited to the embodiments set forth herein. Rather, these embodiments are provided as examples. Also, like numbers refer to like elements throughout. Separate boxes or illustrated separation of functional elements or modules of illustrated systems and devices does not necessarily require physical separation of such functions or modules, as communication between such elements can occur by way of messaging, function calls, shared memory space, and so on, without any such physical separation. As such, functions or modules need not be implemented in physically or logically separated platforms, although they are illustrated separately for ease of explanation herein. Different devices can have different designs, such that while some devices implement some functions in fixed function hardware, other devices can implement such functions in a programmable processor with code obtained from a machine-readable medium.

Figure 11:
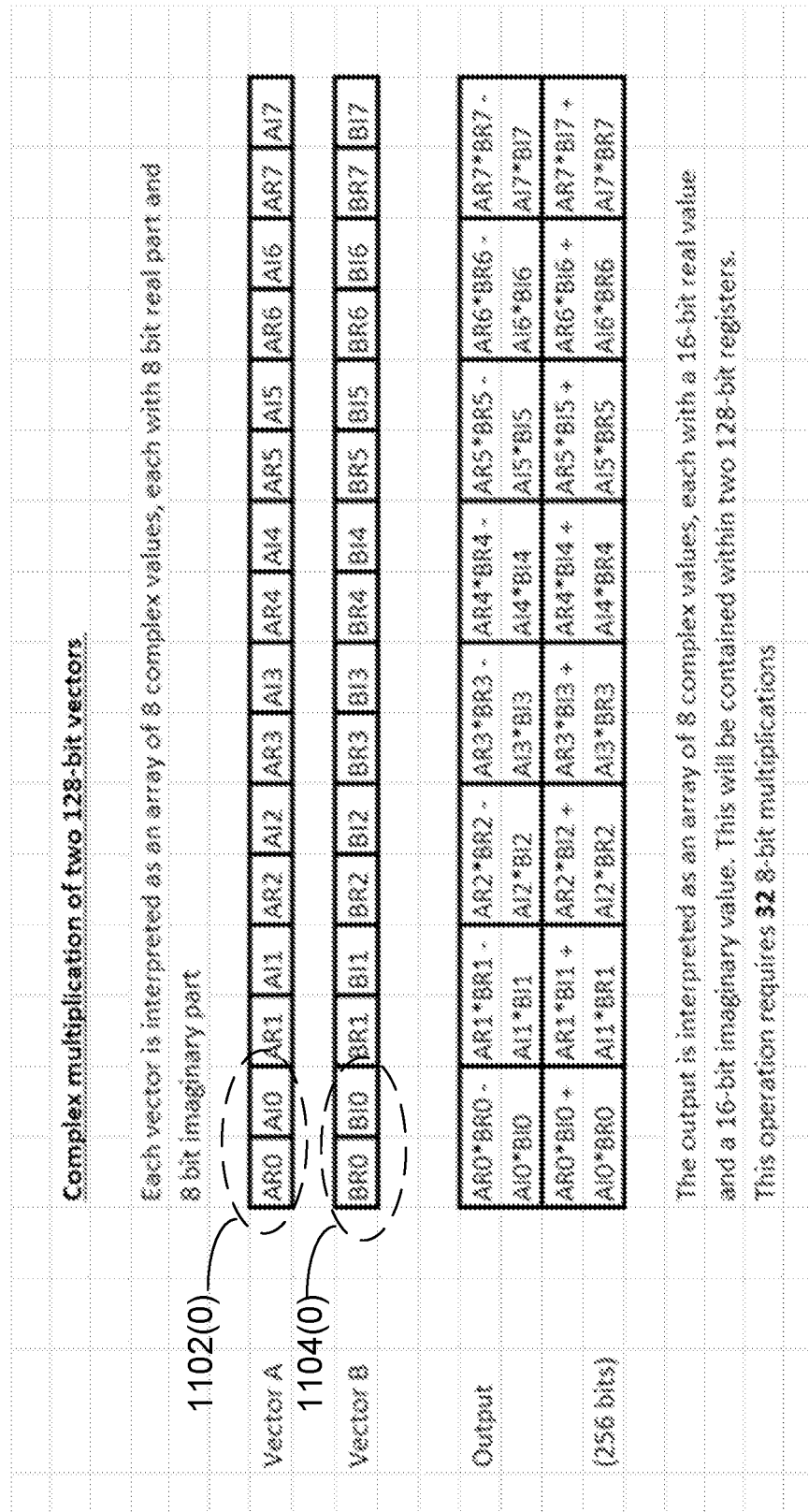
FIG. 11 is a schematic diagram illustrating a complex vector multiplication operation between two complex vectors.

The present application provides a family of processors including processors of different types that are instruction compatible with one another so that the processors of the family may execute instructions in a common instruction set, including multiplication instructions of different types, without requiring hardware or software changes to either the processor or the common instruction set. The multiplication types that may be contemplated, some of which are illustrated in FIGS. 10 to 12, include scalar vector multiplications (e.g., a scalar multiplication 1000 of two 128-bit vectors as shown in FIG. 10), complex vector multiplications (e.g., a complex multiplication 1100 of two 128-bit vectors as shown in FIG. 11), scalar matrix multiplications (e.g., a matrix multiplication 1200 of two 128-bit vectors (also considered as two 4×4 matrix of 8-bit values) as shown in FIG. 12) and complex matrix multiplications (not shown in the Figures).

Architecture of an Embodiment of a System

FIG. 1A is a block diagram of a system 100 for executing an instruction sequence 122 (also referred to as a program 122) written using a common instruction library 116 in accordance with a specific example of implementation. The instruction sequence 122 includes one or more individual instructions including a specific instruction 1222 (also referred to as processing instruction 1222) that defines a multiplication type. Other systems may be suitable for implementing embodiments described in the present disclosure and may include components different from those discussed below. For example, although FIG. 1A shows a single instance of each component depicted in the Figure, there may be multiple instances of each component in the system 100.

As shown in the embodiment of FIG. 1A, the system 100 includes a computing device 102 which comprises a processing unit 104, an instruction memory 114, and a controller. The processing unit 104 incudes a set of multiplication units 106 (i.e., multipliers), processing control circuitry 108, an arithmetic/logical calculation unit (ALU) 110, and a register unit 112. The processing unit 104, also referred to as a processor 104, has a specific cardinality corresponding to a number of multipliers in the set of multiplication units 106. This specific cardinality defines a specific processor type corresponding to the processor 104, which is part of a family of processors including processors of different types as will be described herein. For example, in implementations in which there are 16 multipliers in the set of multiplication units 106, the processor 104 may be referred to as being a processor of a 16-multiplier processor type in a specific family of processors. Such a specific family of processors may include types of processors including an 8-multiplier processor type, a 16-multiplier processor type, a 32-multiplier processor type, a 64-multiplier processor type, and/or or any $2^M*N$-multiplier processor type (where N is an integer no less than 1 (N>=1) and M is an integer no less than 0 (M>=0)). In accordance with practical implementations of the inventions, the family of processor types may include two or more different processor types having respective (distinct) numbers of multipliers.

The arithmetic calculation unit (ALU) 110 incorporates calculation units other than multipliers, such as Add units, Shift units, and so on of the type known in the art. The processing control circuitry 108 is configured to control communications among different components of the processing unit 104 using any suitable known technique, for example including an I/O interface (not shown), a network interface (not shown), a storage unit (not shown), the processing unit 104, the instruction memory 114 of the computing device 102, and so on, via a data bus 118. The data bus 118 may be any suitable bus architecture including, for example, a memory bus, a peripheral bus or a video bus.

The instruction memory 114 may be a volatile or non-volatile memory (e.g., a flash memory, a random-access memory (RAM), and/or a read-only memory (ROM)). The instruction memory 114 stores the program or the instruction set 116 for execution by components of the processing unit 104, such as by using the arithmetic calculation unit (ALU) 110 and/or the set of multiplication units 106 of the processing unit 104. The instruction memory 114 may be provided by a non-transitory computer-readable medium. Examples of non-transitory computer-readable medium include a RAM, a ROM, an erasable programmable ROM (EPROM), an electrically erasable programmable ROM (EEPROM), a flash memory, a CD-ROM, or other portable memory storage.

The computing device 102 may further comprise the register unit 112 (e.g., including a plurality of registers), which stores and loads input data elements to which will be applied operations from the instruction set 116, including multiplication operations. A width of the register unit 112 may be fixed in some implementations or, alternatively, the width of the register unit 112 may be dynamically modulated on the basis of the instruction to be executed from the instruction sequence 122 written using the common instruction library 116.

During execution of instructions from the instruction sequence 122, the controller 120 of the computing device 102 may send the instruction sequence 122 to the instruction memory 114, after which the processing unit 104 may proceed to execute individual instructions from the instruction sequence 122 including the specific instruction 1222. In this regard, the processing unit 104 is configured to decode the specific instruction 1222 and to perform appropriate operations (e.g., multiplications) on the data in the register unit 112. In particular, the processing unit 104 may receive the specific instruction 1222 of the instruction sequence 122 written by using the common instruction set or library 116 via the data bus 118 and may execute the specific instructions 1222 to repeatedly perform multiplications for a determined number of cycles using the set of multiplication units 106 to obtain a result of the operation. As will be discussed in greater detail below, the number of cycles needed to perform the specific instructions 1222 conveying a multiplication instruction corresponds to a number of multiplication cycles that is derived at least in part based on the multiplication type defined by the specific instructions 1222 and on the cardinality of the set of multiplication units 106 of the processing unit 104. In other examples, the instruction sequence 122 may comprise instructions which may be executed by the arithmetic calculation unit 110 to perform add calculation and other instructions executed by other components of the system 100 to perform some specific function. Such instructions may be performed using conventional methods known in the art and will not be described in further detail here.

It will be appreciated that while individual instructions from the instruction sequence 122 written using the common instruction set 116 are executable by the processing unit 104, which is of a specific type in a family of processors, the same individual instructions are also executable by other processors of the same family of processors including processors of different types in that family. In implementations where the family of processing types includes two, three or more processing types, the processors of the different processing types may all have processing control circuitry sharing a common design and/or arithmetic calculation units (ALUs) sharing a common design. Such a design approach may greatly simplify the design of processors having different capabilities by providing a modular approach to processor design. This approach maintains a common design approach for a core set of components (e.g., control circuitry and first arithmetic calculation units) that are used for some common operations (additions, subtractions, division, shift left, shift right, rotate, and some other operations) while providing components with varying levels of cardinality (e.g., different numbers of multipliers) for use in performing other types of operations (e.g., scalar vector multiplication, scalar matrix multiplication, complex vector multiplication, complex matrix multiplication, and so on).

In some examples, the processing unit 104 may be a digital signal processor (DSP), which may be embedded into the computing device 102 amongst other processors. Non-limiting examples of the computing device 102 may include, without being limited to, a central processing unit (CPU), a graphics processing unit (GPU), an artificial intelligence (AI) accelerator, a neural processing unit (NPU), an application-specific integrated circuit (ASIC), a field-programmable gate array (FPGA), a dedicated logic circuitry, or combinations thereof.

In some applications, the system 100 may be an AI system configured to implement various machine learning algorithms. In that case, the system 100 may further include one or more input/output (I/O) interfaces, to enable interfacing with one or more optional input devices and/or optional output devices. In addition, the system 100 may include one or more network interface and antennas which are configured to facilitate wireless communications implemented by the one or more network interface. Alternatively, the system 100 may also include one or more computer readable memory storage units, which may include a mass storage unit such as a solid-state drive, a hard disk drive, a magnetic disk drive and/or an optical disk drive.

Figure 1B:
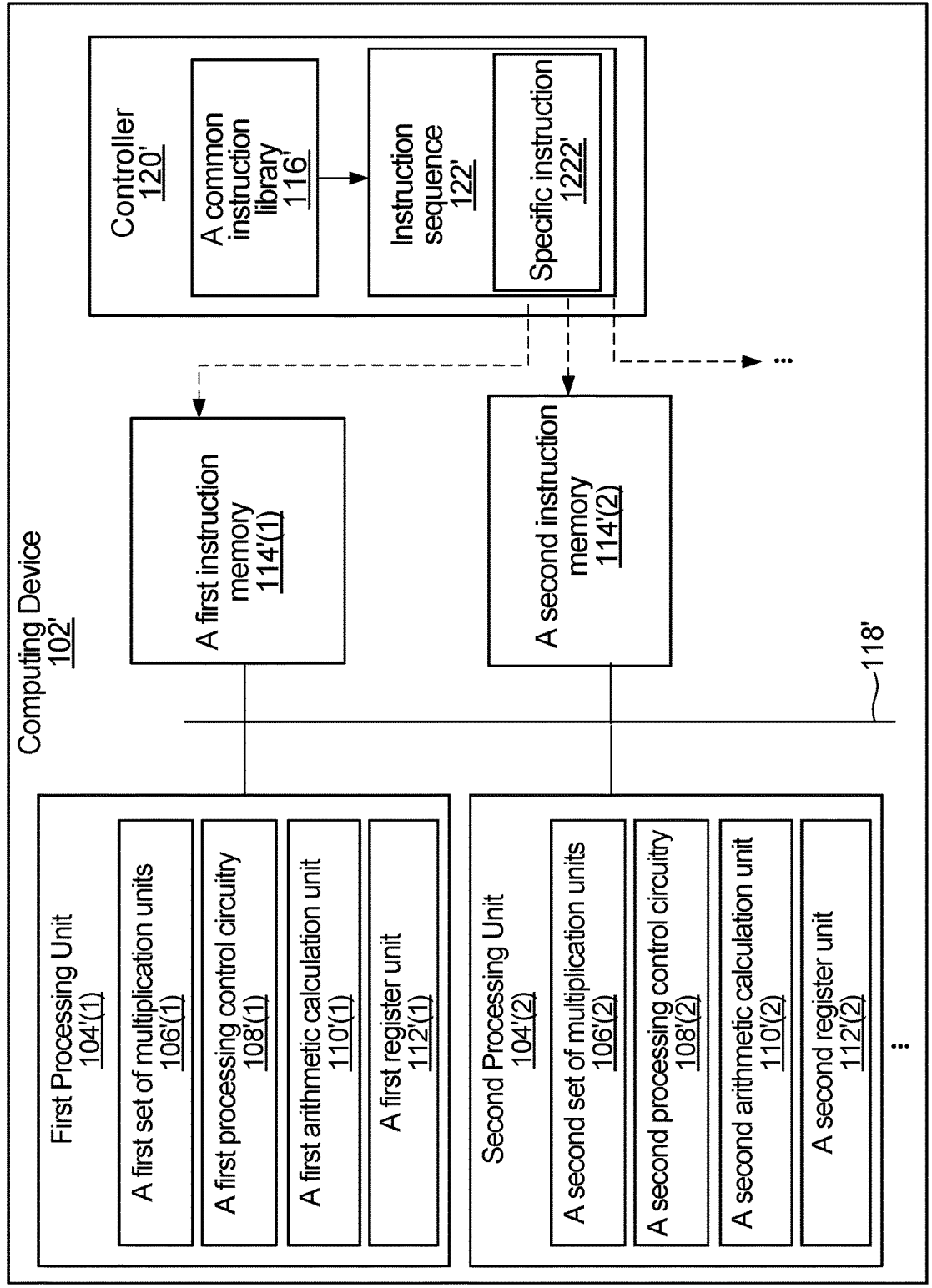
FIG. 1B is a block diagram illustrating a system including two or more processors of two or more distinct processor types selected in a family of processor types for executing processing instructions in an instruction set that is common to the family of processor types, the different processor types in the family of processor types including different numbers of multiplication units, in accordance with a second embodiment of the invention.

FIG. 1B is a schematic diagram of an alternative system 100', which includes a plurality of processing units (two or more processing units) 104'(1), 104'(2), etc., (generically referred to as processing unit 104') at least two of which are of different processor types among a family of processor types. Compared with the system 100 shown in FIG. 1A, processing units (e.g., processing units 104'(1), 104'(2)) correspond to processors of at least two different respective processor types that are embedded within the computing device 102'. In some embodiments, the system 100' may be configured to optimize its performance by selecting a processor of a specific processor type among the plurality of processing units 104'(1), 104'(2), etc. of different respective processor types to execute the instruction sequence 122' that is written using a common instruction library 116'. The computing device 102' includes a plurality of instruction memory 114'(1), 114'(2) (generically referred to as an instruction memory 114') each of which corresponds to a different respective processing unit 104'. In some embodiments, since the instruction sequence 122' is common to the plurality of processing units 104', the controller 120' may be configured to compare the relative performance measurements (e.g. computation speed) of the various processing units 104'(1) 104'(2) to select a specific processing unit based on the comparison, in order to optimize its performance based on various objectives/criteria such as, for example, maximizing computational speed requirements and/or minimizing computational costs and/or other criteria. It is noted that, since the instruction sequence 122' is written using an instruction library 116' that is common to the plurality of processing units 104', one or more processors of any processor type may be selected for executing the instruction sequence 122' without changing the instruction sequence 122'. In addition, it is noted that there is no need to adapt the hardware architecture of the system 100' based on performance requirements in order to be able to execute an instruction sequence 122' written in the common instruction set as processors of any processor type in the family could execute the instruction sequence 122'.

In practical implementations, various criteria may be used to perform a selection of a specific processing unit among the plurality of processing units 104'(1), 104'(2), . . . . For example, take a case where processing unit 104'(1) has N multipliers and processing unit 104'(2) has $2^M*N$ multipliers where M and N are integers, M≥1 and N≥1. Processing unit 104'(2) would be considered to have a higher cardinality than processing unit 104'(1) and would also be more computationally expensive than processing unit 104'(1). A specific processing unit between processing unit 104'(1) and processing unit 104'(2) may be selected to execute a sequence of instructions based on a relative performance improvement between the processing unit 104'(1) and processing unit 104'(2). For instance, if the level of performance associated with using processing unit 104'(1) is X and the level of improvement of processing unit 104'(2) is Y, a performance improvement indicator associated with using the more expensive processor (in this case processing unit 104'(2)) could be expressed as $|X-Y|/X$. If the level of improvement achieved by using the more expensive processor is sufficiently high to justify the added cost, then the system may select processing unit 104'(2) to execute the sequence of instructions 1222'. Otherwise, if the level of improvement does not meet the minimum performance improvement threshold, then the system may select the processing unit 104'(1) to execute the sequence.

For example, in this manner, a specific processor type may be selected to execute the sequence of instructions 1222' based on a performance improvement indicator of which meets a minimum performance improvement threshold (e.g., at least 10%, at least 20%, at least 50%, at least 70%, at least 75%, or more). In some embodiments, when the sequence of instructions 122' includes a high number of multiplication instructions relative to other types of instructions (e.g. additions, subtractions, shift etc . . . ), a specific processor type that minimizes a number of cycles for executing the sequence of instructions 122', for example a processor type that includes a greater number of multipliers, may be selected to execute the sequence of instructions 122' such that computation time may be minimized. Alternatively, for example when the sequence of instructions 122' includes a lower number of multiplication instructions relative to other types of instructions (e.g. additions, subtractions, shift etc . . . ), a specific processor type that has fewer multiplication units may be selected to execute the sequence of instructions 122' so as to minimize the computation cost (i.e., minimize the number of multipliers used to affect an operation). Other examples for selecting a specific processor type amongst two or more processor types in the family of processor types will be described below in greater detail later on in the present disclosure.

Looking to the computing device 102' of FIG. 1B, this computing device 102' includes two processing units 104' each of which corresponds to a different processor type. The two processing units include a first processing unit 104'(1) (also referred to as a first processor) and a second processing unit 104'(2) (also referred to as a second processor). The first processing unit 104'(1) comprises a first set of multiplication units 106'(1), a first processing control circuitry 108'(1), a first arithmetic calculation unit 110'(1), and a first register unit112'(1). A first processor type corresponding to the first processing unit 104'(1) has a specific cardinality corresponding to a number of multipliers in the first set of multiplication units 106'(1). Similarly, the second processing unit 104'(2) comprises a second set of multiplication units 106'(2), a second processing control circuitry 108'(2), a second arithmetic calculation unit 110'(2), and a second register unit 112'(2). As discussed above, a second processor type corresponding to the second processing unit 104'(2) is different than the first processor type and has a specific cardinality corresponding to a number of multipliers in the second set of multiplication units 106'(2), which is different from the cardinality of the first set of multiplication units 106'(1). In some examples, the number of multipliers in the second set of multiplication units 106'(2) may be greater than the number of multipliers in the first set of multiplication units 106'(1). For example, the cardinality of the first set of multiplication units may be N (meaning that the first set includes N multiplication units), and the cardinality of the second set of multiplication units may be $2^M*N$ (meaning that the second set includes $2^M*N$ multiplication units), where N and M are integers no less than 1. For example, in practical implementations, N may be 4, 8, 16, 32 and M may be 1, 2, 3 and so on. It is to be appreciated that the above numbers have been presented for the purpose of illustration only and that alternative implementations with different numbers of multipliers may be contemplated.

Advantageously, in specific examples of implementations, the first processing control circuitry 108'(1) shares a common design with the second processing control circuitry 108'(2), and the first arithmetic calculation unit 110'(1) shares a common design with the second arithmetic calculation 110'(2). In implementations where the family of processing types includes two, three or more processing types, the processors of the different processing types may all have processing control circuitry sharing a common design and/or arithmetic calculation units (ALUs) sharing a common design. As a result, a distinction between the different processor types lies in the number of multipliers provided. Such a design approach may greatly simplify the design of processors having different capabilities by providing a modular approach to processor design. This approach maintains a common design approach for a core set of components (e.g., control circuitry and first arithmetic calculation units) that are used for some common operations (additions, subtractions, division, shift left, shift right, rotate, and some other operations) while providing components with varying levels of cardinality (e.g., different numbers of multipliers) for use in performing other types of operations (e.g., scalar vector multiplication, scalar matrix multiplication, complex vector multiplication, complex matrix multiplication, and so on).

In addition, the computing device 102' comprises a first instruction memory 114'(1) and a second instruction memory 114'(2) to which the instruction sequence 122' may be selectively sent and stored such that the instruction sequence 122' may be executed by any of the first processing unit 104'(1) and the second processing unit 104'(2) via a data bus 118'. When one of the first processing unit 104'(1) and the second processing unit 104(2) is selected, such as by a controller 120', to execute the instruction sequence 122', the controller 120' will send the instruction sequence 122' (including the specific instruction 1222') to one of the instruction memories 114' (e.g., the first instruction memory 114'(1) or the second instruction memory 114'(2)) corresponding to a selected processing unit 104' (e.g., the first processing unit 104'(1) or the second processing unit 104'(2)). For each instruction in the instruction sequence 122', an arithmetic calculation unit corresponding to the selected processing unit (e.g., the first arithmetic calculation unit 110'(1) or the second arithmetic calculation unit 110'(2)) will load input data elements from the appropriate register unit (112'(1) or 112'(2)) and process the instruction. In practical examples of implementations, a respective width of the first and second register unit 112'(1), 112'(2) may be a fixed (a constant) or, alternatively, the width of the first and/or the second register unit 112'(1), 112'(2) may be dynamically modulated on the basis of the specific instruction to be executed.

In FIG. 1B, the instruction sequence 122' is a sequence of instructions that is written by using an instruction library that is common to the first processing unit 104'(1) and the second processing unit 104'(2). In other words, either one of the first processing unit 104'(1) and the second processing unit 104'(2) can be selected to execute the instruction sequence 122', including the specific instruction 1222' defining multiplication operations as well as other types of instructions (e.g. additions, subtractions, shift, etc.). A performance improvement indicator may be used to select one of the processing units 104' to meet a minimum performance improvement threshold. In some examples, the performance improvement indicator may derived by comparing a first length of execution indicator for the first processing unit 104'(1) and a second length of execution indicator for the second processing unit 104'(2). In yet another example, other selection criteria may be applied, alone or in combination with the performance improvement indicator, to select an appropriate processing unit 104' to execute the instruction sequence 122'. Generally, in practical implementation, the selection criteria may include, without being limited to, power consumption levels, system load levels (e.g. other 'instruction sequences' that may need to be executed by the system), latency requirements, performance improvement requirements, computational capacity, and/or others. Examples of methods for selecting a specific processing unit among processing units of different processor types will be described in greater detail below to illustrate how this may be performed in some practical implementations.

Similar to the processing unit 104 of FIG. 1A, each of the first and second processing unit 104'(1) 104'(2) in FIG. 1B may be a DSP. Both of the first and second processing units 104'(1) 104'(2) may be integrated into an application-specific integrated circuit (ASIC), a field-programmable gate array (FPGA), a dedicated logic circuitry, or combinations thereof, within the computing device 102'.

Optionally, the system 100' may further include other components (not shown in the Figures), such as input devices (or ports) and/or output devices (or ports), one or more network interfaces, antennas, computer readable memory storage units, etc., to implement different algorithms used in various kinds of applications, including but not limited to AI applications. AI applications may include applications used in autonomous vehicles, facial recognition, to name a few non-limiting examples.

It is also appreciated that, in the example of FIG. 1B, two processing units 104' of two different respective processor types are provided. It is to be appreciated that alternate systems may include three, four or more processing unit of different processor types. Moreover, multiple processors of each of the different processor types may be included in a same system. During use, one or more processors of any processor type could be selected to implement a specific sequence of instructions, such instruction sequence 122', that is written using the common instruction set 116'. The disclosure is not limited to a particular arrangement and/or to a specific the number of processors and/or number of types of processors in a given system.

Methods

Method1

Figure 2:
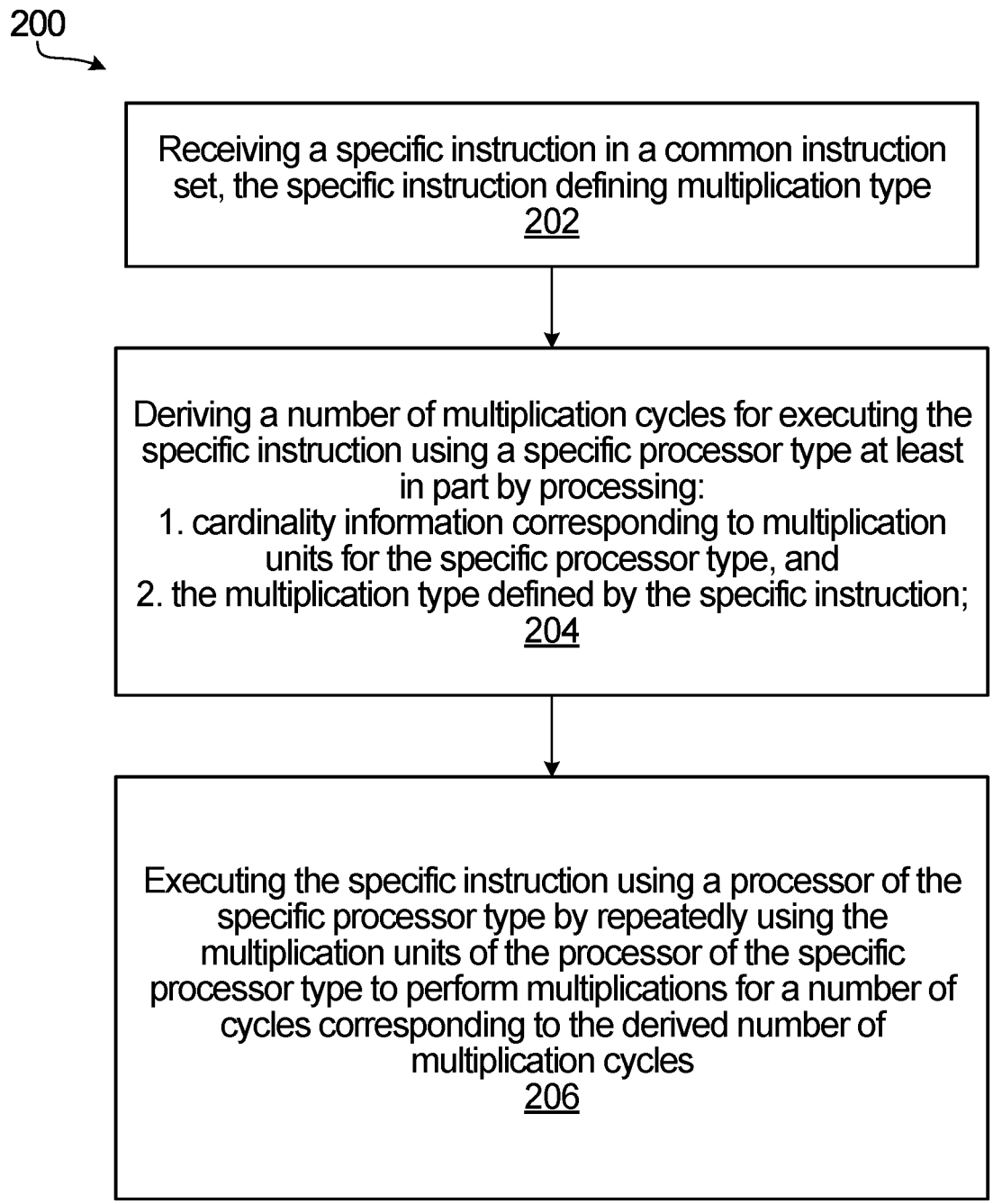
FIG. 2 is a flowchart illustrating a method for executing an instruction from a common instruction set using a processor of a specific processor type selected from a family of processor types, the different processor types in the family of processor types including different numbers of multiplication units, in accordance with a specific embodiment of the invention.

Reference is now made to FIG. 2, which illustrates a method 200 for executing an instruction using a processor of a specific processor type, in accordance with a specific embodiment. The method 200 may be implemented by the system 100 of FIG. 1A. In particular, the processing unit 104 of FIG. 1A, which corresponds to a specific processor type, is one processor of a family of processors corresponding to a family of processor types. In a practical example of implementations, each processor type in the family of processor types includes a different number of multiplication units (e.g., 8, 16, 32, 64, 128, or 1024, multiplication units, etc.). Processors of the family of processor types are configured to execute instructions from a common instruction set, such as the instruction set 116. The method 200 may comprise a number of steps, which will now be described.

As shown, at step 202, a specific instruction from a common instruction set is received by the processing unit 104. The common instruction set could be the instruction set 116 stored in the instruction memory 114 as shown in FIG. 1A and the specific instruction may be the specific instruction 1222 included in the instruction sequence 122 that is written using the instruction set 116. In this specific example, the specific instruction 1222 is a multiplication processing instruction, which defines a multiplication type to be applied to a first input data element and a second input data element. The multiplication type may be one of a plurality of multiplication types, for example: a scalar vector multiplication; a complex vector multiplication; a scalar matrix multiplication or a complex matrix multiplication, to name a few examples. Each of the first input data element and the second input data element may be a scalar vector, complex vector, a scalar matrix, or a complex matrix.

At step 204, a number of multiplication cycles needed for executing the specific instruction 1222 using the processing unit 104 corresponding to the specific processor type is derived. In particular, the processing unit 104 processes cardinality information corresponding to the set of multiplication units 106 and the multiplication type defined by the specific instruction 1222 to derive the number of multiplication cycles needed to execute the instruction 1222. Details of deriving the number of multiplication cycles will be discussed further below.

At step 206, the processing unit 104 executes the specific instruction 1222 by repeatedly using the multiplication units in the set of multiplication units 106 to perform multiplications for a number of cycles corresponding to the number of multiplication cycles derived at step 104.

The method 200 shown in FIG. 2 may provide a method for executing a specific instruction written using the common instruction set for a processor of any specific processor type among a family of processor types. Since the instruction set is common to all processor types in the family, by adjusting the number of cycles required based on the cardinality of the set of multiplication units 106 in the processing unit 104, there is no need to add different respective processing instructions for different processor types. The size of the instruction set may thus be reduced significantly. Accordingly, the time of decoding the instruction set and performing instruction sequences written in the instruction set may be decreased. Furthermore, because the number of multiplication cycles may be derived based on the cardinality of the set of multiplication units 106, any specific processor type corresponding to a specific number of multiplication units could be selected to execute the instruction set without changing the architecture of the processing unit 104. Challenges where specific instruction sets are required for specific processor types are therefore overcome.

Deriving a Number of Cycles Needed to Execute a Multiplication Instruction

Reference is now made with respect to FIGS. 3A-3B, 4A-4B, 5A-5B, 6A-6B, and 7A-7B, which provide examples of how the number of multiplication cycles needed to execute the specific instruction 1222 may be derived at step 204 (as shown in FIG. 2) based on the cardinality information of the set of multiplication units 106 of the processing unit 104 and the multiplication type defined by the specific instruction 1222, in accordance with a specific embodiment.

FIG. 3A illustrates partial pseudo codes 300 for a scalar matrix multiplication instruction, which is an example of the specific instruction 1222. In this specific example, the multiplication type defined by the specific instruction 1222 is a scalar matrix multiplication between a first input data element denoted "input A" (A_matrix in the pseudo code 300) and input B (B_matrix in the pseudo code 300). It is noted that, for the purpose of this example, input A and input B (A_matrix and B_matrix) are scalar matrices (in contrast to complex matrices). FIGS. 4A-4B, 5A-5B, 6A-6B, and 7A-7B illustrate various examples of the first input data element (denoted as input A) and second input data element (denoted as input B) that are defined by the specific instruction 1222.

As presented in FIG. 3A, the specific instruction 1222 defines a first input data element 302, a second input data element 304 and an output 306 that is calculated by performing an operation (e.g., the multiplication operation 314) with the first and second input data element 302, 304. In the example of FIG. 3A, the first input data element 302 is a matrix (denoted as A_matrix), which has rows R1 and columns C1. A first index "Arow" indicates the number of the rows (denoted as R1) of the A_matrix, and a second index "Size" indicates the number of the columns (denoted as C1) of the A_matrix. A respective value of each component within the first input data element 302 could be a scalar value or a complex value represented by 8 bits (in this example although the number of bits may vary in alternate implementations). Similarly, the second input data element 304 is also a matrix (denoted as B_matrix), which has rows R2 and columns C2. A first index "Size" indicates the number of the rows (denoted as R2) of the B_matrix, and a second index "Bcol" indicates the number of the columns (denoted as C2) of the B_matrix. A respective value of each component within the second input data element 304 may also be a scalar value or a complex value represented by 8 bits (in this example although the number of bits may vary in alternate implementations). For this operation, the number of columns C1 of the A_matrix equals to the number of rows R2 of the B_matrix (i.e., C1=R2) such that the multiplication could be performed on the two input matrices A and B, especially on each component in respective rows in the matrix A and each component in respective columns in the matrix B.

Example 1

FIGS. 4A-4B present an example of two input data elements 402, 404 that respectively corresponds to the first input data element 302 (A_matrix) and the second input data element 304 (B_matrix) of the specific instruction 1222. In the specific example shown in FIGS. 4A-4B, each of two input data elements 402, 404 is an 8×8 scalar matrix. The first input data element 402 includes data elements [a0-h7]. The indices [0, 1, 2, . . . 7] indicate that there are 8 columns C1 of the first input data element 402, and the indices [a, b, c, ... h] indicate that there are 8 rows R1 of the first input data element 402. Analogously, the second input data element 404 includes data elements [i0-p7]. The indices [0, 1, 2, ... 7] indicate that there are 8 columns C2 of the second input data element 404, and the indices [I, j, k, ... p] indicate that there are 8 rows R2 of the second input data element 404.

In the case of two 8×8 scalar matrices (as shown in FIGS. 4A and 4B) being the input data elements of a multiplication operation, the output 306 is also a matrix (denoted as C_matrix in the pseudo code shown in FIG. 3A) with 8 rows and 8 columns. In some examples, a respective component of the first input data element 302 (A_matrix) and the second input data element 304 (B_matrix) could be a scalar value or a complex value represented by 8 bits. Each component of the output 306 could be 8 bits, 16 bits, 32 bit, or any other possible number of bits based on implementation of the system 100.

The pseudo code 300 is further executed to invoke an extraction function 308 to extract the number of multiplication units of the processor that will be used to execute the specific instruction 1222, such as the number of the set of multiplication units 106 of the processing unit 104.

As illustrated, the pseudo code 300 also includes a function 310 of calculating the number of multiplication cycles 310 needed to perform the specific instruction 1222 using the processing unit 104 based on an equation (1) as following:

$$Get\_Cycle\_Number = R1*C1*C2/Multiplier\_No \quad \text{(Equation 1)}$$

Where the function "Get_Cycle_Number" represents the derived number of multiplication cycles needed to perform the specific instruction 1222 using the processing unit 104; R1 corresponds to "Arow" in the function 310, denoting the number of rows of the A matrix 302; C1 corresponds to "Size" in the function 310, denoting the number of columns of the A_matrix 302; C2 corresponds to "Bcol" which represents the number of columns of the B_matrix 304; "Multiplier_No" is the cardinality of the set of multiplication units 106 of the processing unit 104 that is extracted by the extract function 308. Furthermore, input A and input B (A_matrix and B_matrix) are scalar matrices and each of "Get_Cycle_Number", R1, C1, C2, and "Multiplier_No" is an integer that is no less than 1.

In some examples, when C1=R2=1, the first input data element and the second input data element may also be referred to as vectors, in contrast to matrices, and are exemplified in FIGS. 7A-7B. In that case, the number of multiplication cycles 310 may be calculated with reference to equation (4) below.

In yet alternative examples, when R1=1 and C2=1, each of the first input data element 302 (A_matrix) and the second input data element 304 (B_matrix) may also be referred to as vectors, in contrast to matrices, and are exemplified in FIGS. 6A-6B. In that case, the number of multiplication cycles 310 may be calculated with reference to equation (4) below.

In some implementations, as illustrated by the pseudo code shown in FIG. 3, a function 312 may be performed to calculate a cycle size, which is used to define how many multiplication units are needed to complete one cycle. The function 312 may be calculated on the basis of equation (2) as follows:

$$Cycle\_size = Size/Get\_Cycle\_Number \quad \text{(Equation 2)}$$

Where "Size" denotes the number of columns of A_matrix 302 or the number of rows of the B_matrix 304 and where the function "Get_Cycle_Number" represents the number of multiplication cycles derived in the equation (1).

Once the number of multiplication cycles 310 is calculated, for example by using equation (1), a matrix multiplication operation 314 may be implemented to use the set of multiplication units 106 in the processing unit 104 as shown in FIG. 1 to repeatedly perform multiplications for the derived number of multiplication cycles 310.

For example, taking the two input data elements to be two scalar matrices, such as the matrix A 402 and the matrix B 404 as shown in FIGS. 4A and 4B, each has 8 scalar components in each row, and 8 scalar components in each column for a total of 64 scalar components.

Taking a first example where the specific processor type of the processing unit 104 is a 1024-multiplier processor type, the processing unit 104 may invoke the extraction function 308 to obtain that the cardinality of the set of multiplication units 106 and obtain as a result 1024. By applying R1=8, C1=8, C2=8, and Multiplier_No=1024 in the equation (1), the result of the equation (1) would be 0.5. However, because the number of multiplication cycles 310 should be an integer, the number needed multiplication cycle will be rounded up to 1. This means that using this specific processor type, one (1) multiplication cycle will be needed to execute the instruction.

Taking another example in which the specific processor type of the processing unit 104 is a 64-multiplier processor type, the processing unit 104 may invoke the extraction function 308 to obtain that the cardinality of the set of multiplication units 106 and obtain as a result 64. Thus, based on the equation (1) where R1=8, C1=8, C2=8, and Multiplier_No=64, the number of multiplication cycles 310 will equal 8 (8×8×8/64=8). This means that using this other specific processor type, eight (8) multiplication cycles will be needed to execute the instruction.

Taking yet another example in which the specific processor type of the processing unit 104 is an 8-multiplier processor type, the processing unit 104 may invoke the extraction function 308 to obtain that the cardinality of the set of multiplication units 106 and obtain as a result 8. Therefore, based on the equation (1) where R1=8, C1=8, C2-8, and Multiplier_No=8, the number of multiplication cycles 310 will equal 64 (8×8×8/8=64). This means that using this other specific processor type, sixty-four (64) multiplication cycles will be needed to execute the instruction.

In this example, although the respective numbers of the multiplication cycles for the three distinct processor types (e.g., a 1024 multiplier processor type, a 64-multiplier processor type, and a 8-multiplier processor type) are different, the scalar matrix multiplications could be performed by a processor of any of these three processor types without changing the architecture of the processing unit 104 or modifying/adding additional instructions into the common instruction library 116. Thus, processors associated with the family of processor types are designed to execute an exact same instruction set. Furthermore, since a specific instruction is not limited to be applied to a specific processor type, any type of processor from the family of processors could be selected to execute the instruction based on system performance requirements (e.g., high efficiency requirement, high computational performance requirement, less hardware cost requirement, reduced power consumption level requirement, etc.).

Example 2

Figures 5A, 5B:
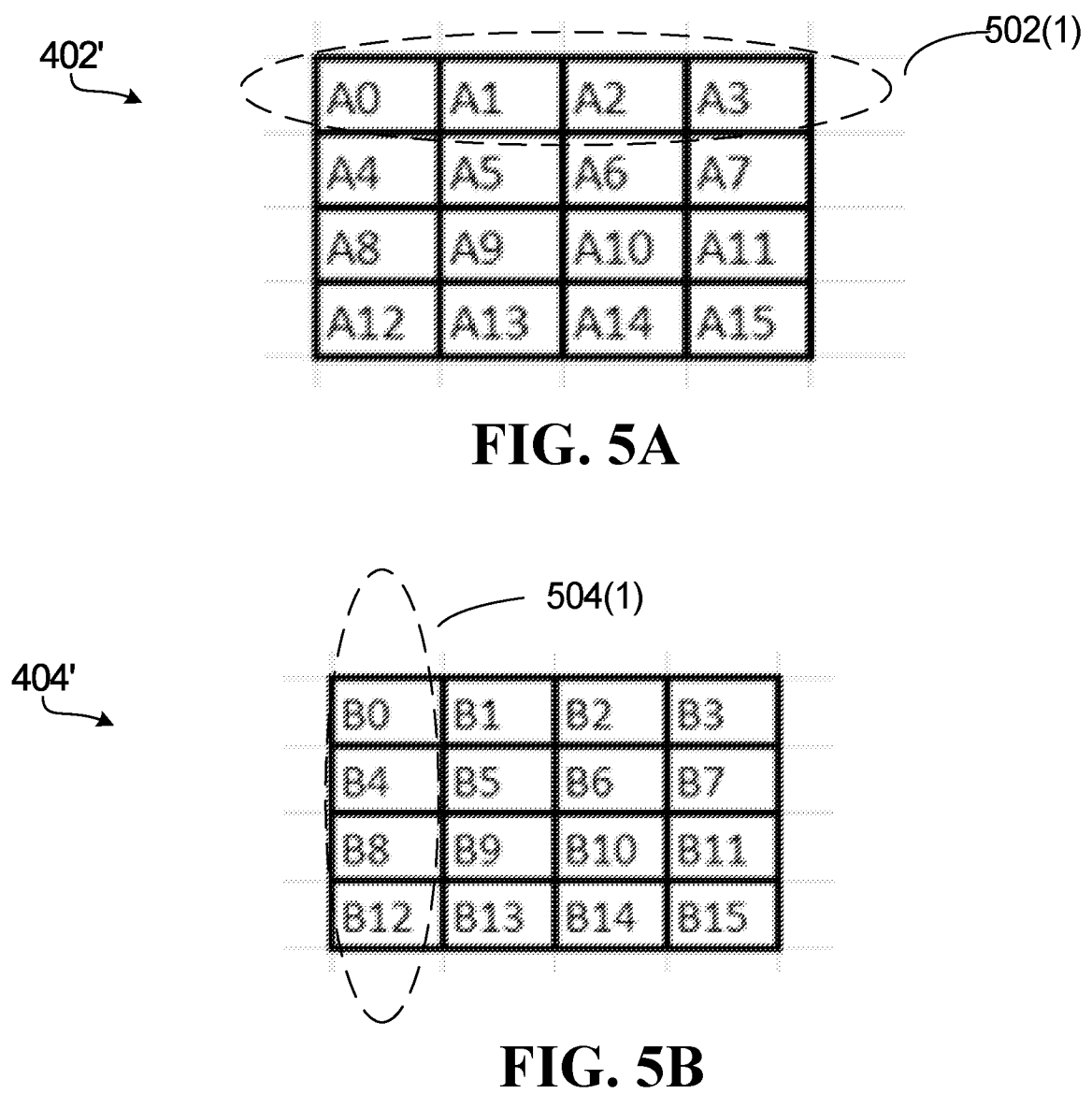

FIGS. 5A-5C present an alternative example to assist the reader in understanding the parameters for calculating the number of multiplication cycles needed to execute a multiplication instruction. In particular, FIGS. 5A-5B present two input matrices 402' and 404' each of which is an 4×4 scalar matrix and FIG. 5C shows an output C_matrix 406' which is an output of a scalar matrix multiplication between the two input matrices 402' and 404'.

As shown in FIGS. 5A-5B, the A_matrix 302 of the pseudo code of FIG. 3 is a first input data element 402' including 4×4 scalar components, and the B_matrix 304 is a second input data element 404' including 4×4 scalar components. When a scalar matrix multiplication is applied on the first and second input data element 402' 404' (also denoted as A_matrix and B_matrix respectively), each row of the A_matrix 402' is multiplied with each column of the B_matrix 404' to produce each component of the C_matrix 406' (corresponding to the C_matrix 306 as shown in FIG. 3). In particular, as presented in FIGS. 5A and 5B, for a first step, a first row (including 4 scalar components [A0, A1, A2, A3]) of the A_matrix 402' (denoted by dashed circle 502(1)) is multiplied with a first column (including 4 scalar components [B0, B4, B8, B12]) of the B_matrix 404' (denoted by dashed circle 504(1)) to calculate the output for a first component of the C_matrix 406' (C0=A0*B0+A1*B4+A2*B8+A3*B12) (denoted by dashed circle 506(1)). As can been seen, four multiplications are needed to derive one of the entries in the C_matrix. The A_matrix 402' has a size (R1, C1) and the B_matrix 404' has a size (R2, C2). The number of components in a row of the A_matrix depends on the number of columns of the A_matrix (C1). The number of components in a column of the matrix B depends on the number of rows of the matrix B (R2). For the first step, 4 multipliers are used to generate the first component 506(1), namely to calculate A0*B0; A1*B4; A2*B8; A3*B12. To finish the scalar matrix multiplication, similar to the first step, each row of the A_matrix 402' will be respectively multiplied with 4 different respective columns of the matrix B 404' until all the rows of the matrix A 402' are multiplied with all the columns of the matrix B 404'. Thus, the number of steps needed in total will be: R1×C2. Accordingly, the number of multiplication units needed in total to achieve the scalar matrix multiplication would be R1×C1×C2. Once the number of multiplication units of a processor is extracted, the number of multiplication cycles can be derived based on equation (1) above.

FIGS. 3A and 4A-5C demonstrate examples of matrix multiplication when two input data elements are scalar matrices. This is only illustrative and not intended to be limiting. In other examples, one or both input data elements may be scalar vectors, which could be considered as a type of a matrix in which either the number of rows or the number of columns is equal to 1.

Example 3

FIGS. 6A-6B depict an example of two input vectors, one of which is an 1×8 scalar vector 402" (vector A), and the other one of which is an 8×1 scalar vector 404" (vector B). FIG. 6C depict an output of a scalar vector multiplication where the vector A and B 402" 404" are inputs. As discussed above, the vector A 402" is considered as a matrix with a row number equal to 1 (i.e., R1=1), and the vector B 404" is considered as a matrix with a column number equal to 1 (i.e., C2=1). When a scalar vector multiplication is applied to the vector A and B 402" 404" based on the specific instruction 1222, each scalar component in the vector A 402" is multiplied with a corresponding scalar component in the vector B 404". A total of 8 multipliers (or multiplication operations) are needed to implement the scalar vector multiplication. The total number of multipliers equals to a column number of the vector A 402" (C1) or a row number of the vector B 404" (R2). Therefore, for the pseudo code shown in FIG. 3, the number of multiplication cycles 310 in this particular case may instead be calculated by the following equation (3):

$$\text{Get\_Cycle\_Number} = C1 (\text{or } R2)/\text{Multiplier\_No} \quad \text{(Equation 3)}$$

In the example of FIGS. 6A-6B, C1=R2=8.

In the case where the specific processor type of the processing unit 104 is a 1024-multiplier processor type, the result of the equation (3) would be $1/128$ ($8/1024=1/128$). However, because the number of multiplication cycles 310 should be an integer, the number of needed multiplication cycles is 1 (rounded up). This means that using this specific processor type, one (1) multiplication cycle will be needed to execute the instruction.

In the case where the specific processor type of the processing unit 104 is a 64-multiplier processor type, the result of the equation (3) should be $1/8$ ($8/64=1/8$). However, because the number of multiplication cycles 310 should be an integer, the number of needed multiplication cycles is 1 (rounded up). This means that using this specific processor type, one (1) multiplication cycle will be needed to execute the instruction.

In the case where the specific processor type of the processing unit 104 is an 8-multiplier processor type, the processing unit 104 may invoke the extraction function 308 to obtain that the cardinality of the set of multiplication units 106 is 8. Therefore, by applying C1=8 and Multiplier_No=8 in the equation (3), the number of multiplication cycles 310 equals 1 (1=8/8). This means that using this specific processor type, one (1) multiplication cycle will be needed to execute the instruction.

Example 4

FIGS. 7A-7B illustrate another example showing two input scalar vectors, one of which is an 8×1 scalar vector 402''', and the other one of which is an 8×1 scalar vector 404'''. The vector A 402''' is a matrix having one (1) column number (C1=1), and the vector B 404''' is a matrix having one (1) row (R2=1). When a scalar vector multiplication is applied to scalar vectors A and B 402''' 404''' based on the specific instruction 1222, a scalar component in each row of the vector A 402''' is multiplied with each scalar components (each column of vector B) of the vector B 404''' to generate the output vector C 406''' shown in FIG. 7C. Thus, the total number of multipliers needed is R1×C2, in this case 64. Accordingly, the number of multiplication cycles 310 may instead be calculated by the following equation (4):

$$\text{Get\_Cycle\_Number} = R1 \times C2/\text{Multiplier\_No} \quad \text{(Equation 4)}$$

In the example of FIGS. 7A-7B, R1=8 and C2=8.

In the case where the specific processor type of the processing unit 104 is a 1024-multiplier processor type, the result of the equation (4) would be $1/16$. However, because the number of multiplication cycles 310 should be an integer, the number of needed multiplication cycles is 1 (rounded up). This means that using this specific processor type, one (1) multiplication cycle will be needed to execute the instruction.

In the case where the specific processor type is a 64-multiplier processor type of the processing unit 104, the result of the equation (4) would be 1 ($8 \times 8/64=1$). This means that using this specific processor type, one (1) multiplication cycle will be needed to execute the instruction.

In the case where the specific processor type is an 8-multiplier processor type of the processing unit 104, the processing unit may invoke the extraction function 308 to obtain that the cardinality of the set of multiplication units 106 is 8. Therefore, based on the equation (4), the number of multiplication cycles 310 needed would be 8 (8×8/8=8). This means that using this specific processor type, eight (8) multiplication cycle will be needed to execute the instruction.

It should be appreciated that equations (1), (3), (4) are formulated based on components in the two input data elements (e.g., A_matrix and B_matrix 402, 404, A_matrix and B_matrix 402', 404', vectors A and B 402'', 404'', and vectors A and B 402''', 404''') being scalar values. Thus, a multiplication type of the multiplication function 314 implemented is a scalar matrix multiplication or a scalar vector multiplication.

Example 5

By way of another non-limiting example, in other possible configurations, the components in the two input data elements of a multiplication instruction may represent complex numbers/values each of which includes a real part and an imaginary part.

If the matrices A and B are complex matrices, the calculation of the number of multiplication cycles will be different than that used for scalar values as the number of multiplications required to multiply two complex numbers will be higher than to perform a multiplication between two scalar numbers. In particular, the number of multiplications required to multiply two complex matrices may be calculated by performing an equation (5) as following:

$$\text{Get\_Cycle\_Number} = R1*C1*C2*4/\text{Multiplier\_No} \quad \text{(Equation 5)}$$

Equation (5) is analogous to the equation (1) except a "4" multiplier is added as a factor to be multiplied with R1, C1 (or R2) and C2 because four multiplications are needed for each complex number namely: a real part in the complex matrix A is multiplied with two respective parts (e.g., a real part and an imaginary part) in the complex matrix B respectively, and an imaginary part in the complex matrix A is multiplied with two respective parts (e.g., a real part and an imaginary part) of the complex matrix B respectively.

Example 6

Figure 8C:
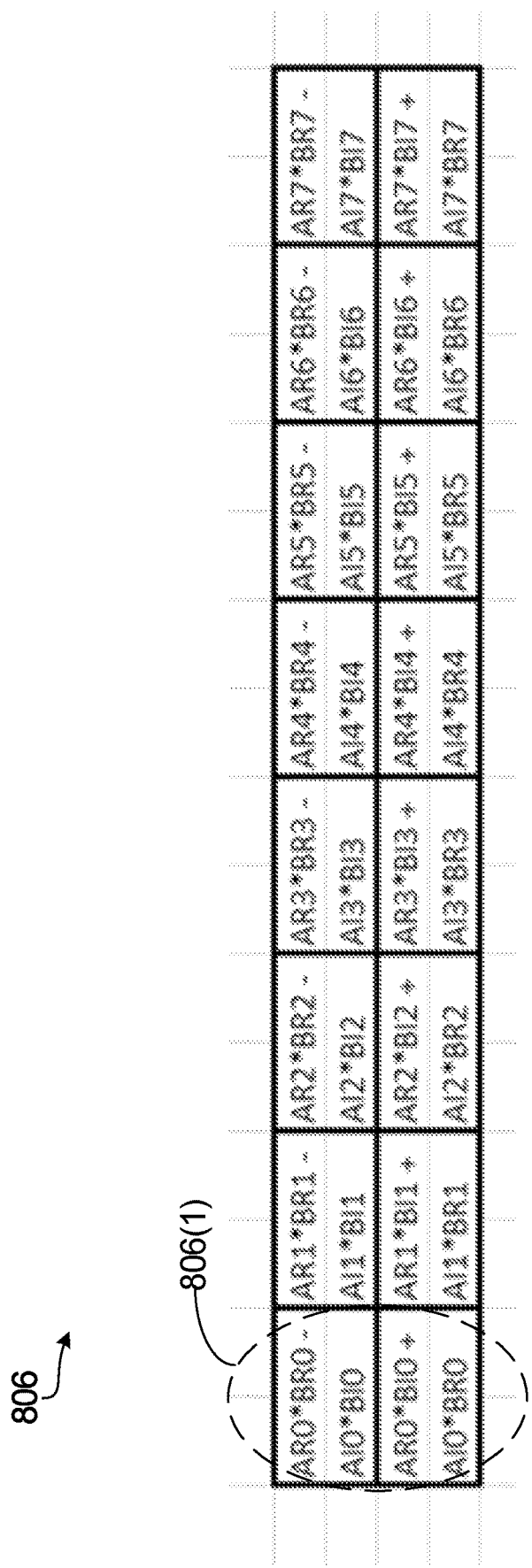
FIG. 8C is a schematic diagram of an output that is generated by inputting the two input vectors of FIGS. 8A-8B to the complex vector multiplication operation 314' of FIG. 3B in accordance with an embodiment of the invention.

Reference is now made to FIGS. 8A-8C, which illustrate how an output may be generated by inputting two complex vectors into a complex vector multiplication operation.

FIG. 3B illustrates partial pseudo codes 300' for a complex vector multiplication instruction, which is an alternative example of the specific instruction 1222. In this specific example, the multiplication type defined by the specific instruction 1222 is a complex vector multiplication between a first input data element denoted "input A" (complex_char_A in the pseudo code 300') and input B (complex_char_B in the pseudo code 300'). It is noted that, for the purpose of this example, input A and input B (complex_char_A and complex_char_B) are complex vectors (in contrast to scalar vectors). FIGS. 8A and 8B illustrate various examples of the first input data element (denoted as input A) and second input data element (denoted as input B) that may be defined by the specific instruction 1222.

Compared with the partial pseudo code 300 shown in FIG. 3A, which represents a scalar multiplication, the partial pseudo code 300' represents a complex multiplication. In the example of FIG. 3B, the specific instruction 1222 defines a first input data element 302', a second input data element 304' and an output 306' that is calculated by performing a complex multiplication 314' with the first and second input data element 302', 304'. The first input data element 302' is a complex vector (denoted as complex_char_A), which has a number "Length" of columns of complex components (which can be denoted as C1'). Since this is a vector rather than a matrix, complex_char_A can be considered to have a single row (denoted as R1'=1). Each component within the first input data element 302' is a complex value including a real part and an imaginary part each of which is represented by a specific number of bits (in this example each is 8 bits however the number of bits may vary in alternate implementations). Similarly, the second input data element 304' is also a complex vector (denoted as complex_char_B), which has number "Length" of rows of complex components (which can be denoted as R2'). Since this is a vector rather than a matrix, complex_char_B can be considered to have a single column (denoted as C2'=1). Each component within the second input data element 304' is a complex value including a real part and an imaginary part each of which is represented by a specific number of bits (in this example each is 8 bits however the number of bits may vary in alternate implementations).

For this operation, the number of first columns of the complex_char_A vector equals to the number of rows of the complex_char_B vector (i.e., C1'=R2') such that the complex multiplication 314' could be performed on the two input complex vectors A and B.

FIGS. 8A-8B illustrate an example of two input vectors one of which is an 1×8 complex vector (complex vector A 802), and the other one of which is an 8×1 complex vector (complex vector B 804). FIG. 8C shows an output vector C 806 generated by performing complex vector multiplications, such as the complex vector multiplication 314' as shown in FIG. 3B, on the complex vector A 802 and the complex vector B 804. For a first step, a first component of complex vector A 802 ((AR0, AI0) denoted by a dashed cycle 812(1)) in is multiplied by a first component of complex vector B 804 ((BR0, BI0) denoted by a dashed cycle 814(1)) to generate a first component of vector C 806 (((AR0*BR0-AI0*BI0), (AR0*BR0+AI0*BI0)) denoted by a dashed cycle 816(1)). That is, 4 multipliers are needed to calculate a single component of vector C 806(1). There are C1' components in the vector A 802. A total of 4×C1' multipliers would be needed to implement the complex vector multiplication (e.g., the complex vector multiplication 314') between complex vector A 802 and complex vector B 804. Accordingly, for two input data elements being complex vectors one of which is of size 1×C1', and the other one of which is of size R2'×1, the number of multiplication cycles instead be calculated by the following equation (6) that is shown in a function 310' in the pseudo code 300':

$$\text{Get\_Cycle\_Number} = C1' \times 4/\text{Multiplier\_No} \quad \text{(Equation 6)}$$

Where the function "Get_Cycle_Number" 310', shown in FIG. 3B, represents the derived number of multiplication cycles needed to perform the specific instruction 1222 using the processing unit 104; C1' denotes the number of columns of the complex_char_A 302'; "Multiplier_No" is the cardinality of the set of multiplication units 106' of the processing unit 104' that is extracted by the extract function 308'. Furthermore, complex_char_A and complex_char_B are complex vectors and each of "Get_Cycle_Number", C1', and "Multiplier_No" is a function that returns an integer that is no less than 1.

In an alternative embodiment in which complex vector A is of size R1'×1 and complex vector B is of size 1×C2', the number of multiplication cycles may instead be calculated by the following equation (7) and the function 310' would be replaced by:

$$\text{Get\_Cycle\_Number} = R1' \times C2' \times 4 / \text{Multiplier\_No} \quad \text{(Equation 7)}$$

Where the function "Get_Cycle_Number" represents the derived number of multiplication cycles needed to perform the specific instruction 1222 using the processing unit 104; R1' denotes the number of rows of the complex_char_A 302'; C2' represents the number of columns of the complex_char_B 304'; "Multiplier_No" is the cardinality of the set of multiplication units 106' of the processing unit 104' that is extracted by the extract function 308'. Furthermore, complex_char_A and complex_char_B are complex vectors and each of "Get_Cycle_Number", R1', C2', and "Multiplier_No" is a function that returns an integer that is no less than 1.

Based on the examples described above with reference to FIGS. 3A to 8C and equations (1) and (3)-(7), once the number of multiplication cycles required to execute multiplication instructions is calculated based on the multiplication type (e.g. a scalar vector multiplication; a complex vector multiplication; a scalar matrix multiplication and a complex matrix multiplication) and the cardinality information of the set of multiplication units, the processing unit 104 may proceed to execute a multiplication function (for example multiplication function 314 or 314' shown in FIGS. 3A and 3B) using the set of multiplication units 104 repeatedly for the number of calculated multiplication cycles. The pseudo codes 300 shown in FIG. 3A for a scalar matrix/vector multiplication and the pseudo codes 300' shown in FIG. 3B for a complex matrix/vector multiplication can each be executed by any processor in a processor family contemplated by the present disclosure without making hardware or software changes (e.g., without architecture changes and without changes to the specific instruction 1222). Thus, flexibility of the system 100 may be improved significantly.

Method2

Figure 9:
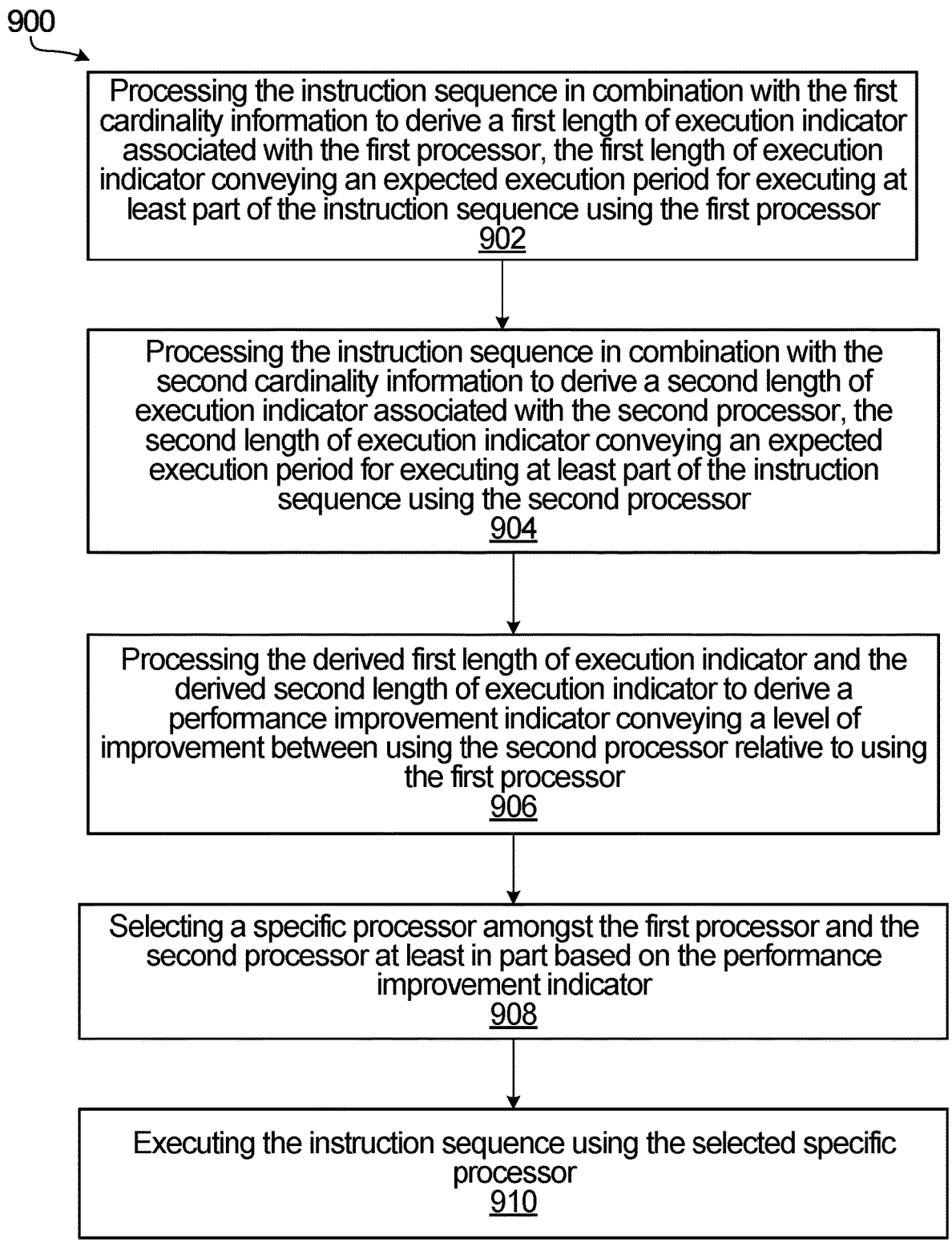
FIG. 9 is a flowchart illustrating a method of executing an instruction sequence using a processing system including a first processor of a first processor type and a second processor of a second processor type, the first processor type corresponding to first cardinality information and the second processor type corresponding to second cardinality information in accordance with an alternative embodiment of the invention.

In a scenario where processing units within a system have multiple processors of two or more processor types, a different processor type may be selected to execute an instruction sequence based on various criteria (e.g., performance requirements, cost requirements, etc.). FIG. 9 presents a method 900 for executing an instruction sequence using a specific processor selected amongst processors of two or more different respective processor types, in accordance with an example embodiment.

The instruction sequence is written using the common instruction library 116' and may include a plurality of instructions selected from the library 116' arranged in such a manner as to form a program (or part of a program). The plurality of instructions in the instruction sequence may include instructions defining a multiplication type (e.g. a scalar vector multiplication; a complex vector multiplication; a scalar matrix multiplication; a complex matrix multiplication) and instructions defining operations other than a multiplication type (an addition; a subtraction; a division; a shift left; a shift right; a rotate, amongst other possible operations).

The method 900 may be implemented by the system 100' of FIG. 1B, which includes processors of two or more different processor types (e.g., the first processing unit 104'(1) and the second processing unit 104'(2)). In this example, the first processing unit 104'(1) of a first processor type corresponds to first cardinality information conveying a number of multiplication units in the first processor type. The second processing unit 104' (2) of a second processor type corresponds to second cardinality information conveying a number of multiplication units in the second processor type. The first and second processor types are two different processor types of a family of processor types and each includes a different number of multiplication units (e.g., 8, 16, 32, 64, 128, or 1024, multiplication units, etc.). For the purpose of the present example, the second cardinality information is greater than the first cardinality information, meaning that the second processing unit 104'(2) has a greater number of multipliers that the first processing unit 104'(1). For example in some implementations, the number of multiplication units in the first processing unit 104'(1) may be N and the number of multiplication units in the second processing unit 104'(2) may be $2^M * N$, wherein N and M are integers ≥1. For example, the first processing unit 104'(1) depicted may be a 16-multiplier processor type, and the second processing unit 104'(2) may be a 512-multiplier processor type. The first and second processing units 104' (1), 104'(2) are configured to execute an instruction sequence written using a common instruction set, such as the instruction sequence 122' written using the instruction set 116'. The method 900 comprises:

At step 902, the instruction sequence in combination with the first cardinality information may be processed by the computing device 102', such as the controller 120', of the system 100', to derive a first length of execution indicator associated with the first processing unit 104'(1) or first processor. The first length of execution indicator (denoted as T1) conveys an expected execution period (for example an expected number of computer cycles) for executing the instruction sequence using the first processing unit 104'(1).

In a specific non-limiting embodiment, the controller 120' is configured to derive the first length of execution indicator (T1) by (i) deriving a first number of cycles needed to execute all the instructions defining a multiplication type in the instruction sequence (denoted as Tm1) and (ii) deriving a second number of cycles needed to execute all instructions defining a function other than a multiplication type in the instruction sequence (denoted To1). That is, the first length of execution indicator is calculated by following equation (8):

$$T1 = Tm1 + To1 \quad \text{(Equation 8)}$$

Where T1 represents the first length of execution indicator that conveys the expected execution period for executing the instruction sequence using the first processing unit 104'(1).

For the purpose of this example, for instructions defining a function other than a multiplication type instruction sequence, we take the case where each one of these instructions (e.g. type (an addition; a subtraction; a division; a shift left; a shift right; a rotate, amongst other possible operations)) would be executed in a single cycle by the first processing unit 104'(1). As such To1= "Number of instructions in the instruction sequence defining a function other than a multiplication type". More generally, we can instead take the case where each one of these instructions would take a same number of cycles irrespective of the processor type used to execute the instruction. In such a case, To1 may be expressed as:

$$T01 = \sum_{n=1}^{W} \text{Cycle\_number}_n(\text{Operation type}_n)$$

where W is the number of operations in the instruction sequence other than the multiplication operations.

Looking now to the instructions in the instruction sequence defining a multiplication type, for each of these instructions, the number of cycles needed would be derived based on the first cardinality information of the first processor 104'(1) and the multiplication type defined by that instruction. Step 204 of the method shown in FIG. 2 as well as equations (1), (3), (4), (5), (6) and (7) described above show how to derive a number of cycles for a specific instruction defining a multiplication based on cardinality information and the multiplication type defined by that instruction. As such Tm1 would be calculated as follows:

$$Tm1 = \sum_{n=1}^{K} \text{Multiplication\_cycle\_number}_n(\text{first cardinality, multiplication type}_n)$$

Where K is the number of multiplication operations in the instruction sequence.

Figure 18A:
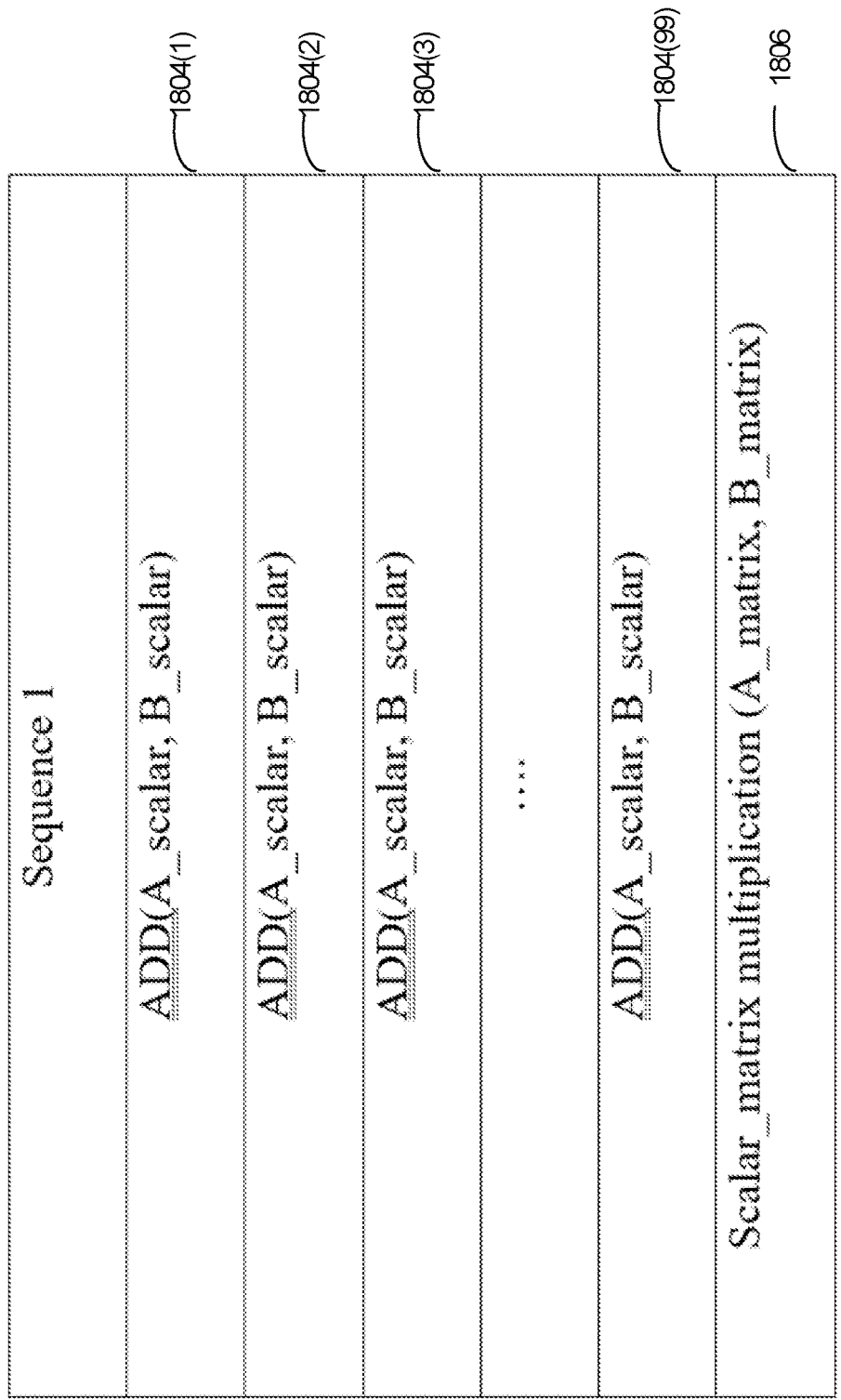
FIG. 18A is a schematic diagram illustrating an example of the instruction sequence 122' that may be written by using the common instruction library 116' of FIG. 1B, in accordance with a specific embodiment of the invention.

To illustrate the above, two very specific examples of instructions sequences will now be described with reference to FIGS. 18A and 18B. FIG. 18A presents a very specific example of the instruction sequence 122', which is a first instruction sequence 1802. The first instruction sequence 1802 comprise 99 "Add" operations 1804(1)-1804(99) (generically referred to as Add operation 1804) and 1 scalar matrix multiplication 1806. In that case, Tm1 would equal to a number of multiplication cycles used to execute the scalar matrix multiplication 1806 using the first processing unit 104'(1). To1 would equal to a number of cycles to execute the 99 Add operations. Assuming each Add operation needs one single cycle (1 cycle) to be executed, 99 Add operations will need 99 cycles in total. Therefore, To1=99 cycles.

Regarding Tm1, which represents the number of multiplication cycles used to execute the scalar matrix multiplication 1806 by the first processor, let us take as an example a case where the first processing unit 104'(1) corresponding to a 16-multiplier processor type (i.e. with 16 multipliers) and the first and second input data elements being 8×8 scalar matrices. Since the multiplication type is a scalar matrix multiplication, the equation (1) discussed above could be utilized to calculate the number of multiplication cycles required to perform this multiplication instruction. Therefore, after applying the number of rows and columns of the first input data element, the number of columns of the second input data element, and the cardinality information of the first processing unit 104'(1) in the equation (1) (e.g., R1=8, C1=8, C2=8, Multiplier_No=16), the number of multiplication cycles required to execute this instruction 1806 would be 32 (8×8×8/16=32). Thus, in this example Tm1=32 cycles.

Accordingly, based on the equation (8) and calculated To1 and Tm1, T1=Tm1+To1=99+32=131 cycles. As such, it would take the first processing unit 104'(1) 131 cycles to execute the instruction sequence 1802.

Returning to FIG. 9, at step 904, the instruction sequence in combination with the second cardinality information is processed by the computing device 102', such as the controller 120', of the system 100', to derive a second length of execution indicator associated with the second processing unit 104'(2) or second processor. The second length of execution indicator (denoted as T2) conveys an expected execution period (for example an expected number of computer cycles) for executing the instruction sequence using the second processor 104'(2).

As was the case for the first processing unit 104'(1), the controller 120' is configured to derive the second length of execution indicator (T2) by (i) deriving a first number of cycles needed to execute all the instructions defining a multiplication type in the instruction sequence (denoted as Tm2) and (ii) deriving a second number of cycles needed to execute all instructions defining a function other than a multiplication type in the instruction sequence (denoted To2). That is, the second length of execution indicator is calculated by following equation (9):

$$T2 = Tm2 + To2 \quad \text{(Equation 9)}$$

Where T2 represents the second length of execution indicator that conveys the expected execution period for executing the instruction sequence using the second processor.

Similar to what was described above with reference step 902, at step 904, To2="Number of instructions in the instruction sequence defining a function other than a multiplication type". More generally, we can instead take the case where each one of these instructions would take a same number of cycles irrespective of the processor type used to execute the instruction. In such a case, To2 may be expressed as:

$$TO2 = \sum_{n=1}^{W} \text{Cycle\_number}_n(\text{Operation type}_n)$$

where W is the number of operations in the instruction sequence other than the multiplication operations.

Looking now to the instructions in the instruction sequence defining a multiplication type, for each of these instructions, the number of cycles needed would be derive based on the second cardinality information of the second processor 104'(2) and the multiplication type defined by that instruction. Step 204 of the method shown in FIG. 2 as well as equations (1), (3), (4), (5), (6) and (7) described above show how to derive a number of cycles for a specific instruction defining a multiplication based on cardinality information and the multiplication type defined by that instruction. As such Tm2 would be calculated as follows:

$$Tm2 = \sum_{n=1}^{K} \text{Multiplication\_cycle\_number}_n(\text{second cardinality, multiplication type}_n)$$

Where K is the number of multiplication operations in the instruction sequence.

To illustrate the above, we again look at the example depicted in FIG. 18A and we apply the above process to derive the second length of execution T2. Since there are 99 Add operations in the first instruction sequence 1802, assuming 1 cycle per add operation, 99 cycles are needed to execute the 99 Add operations 1804. Thus, To2=99 cycles.

Regarding Tm2, which represents the number of multiplication cycles used to execute the scalar matrix multiplication 1806 by the second processor, let us take as an example a case where the second processing unit 104'(2) corresponds to a 512-multiplier processor type (i.e. with 512 multipliers). Since the multiplication type is a scalar matrix multiplication, the equation (1) discussed above could be utilized to calculate the number of multiplication cycles required to perform this multiplication instruction. After applying the number of rows and columns of the first input data element, the number of columns of the second input data element, and the cardinality information of the second processing unit 104'(2) into the equation (1) (e.g., R1-8, C1=8, C2-8, Multiplier_No=512), the number of multiplication cycles would be 1 (8×8×8/512=1). Thus, in this example Tm2=1 cycle.

Consequently, based on the equation (9) and calculated To2 and Tm2, T2=Tm2+To2=99+1=100 cycles. As such, it would take the second processing unit 104'(2) 100 cycles to execute the instruction sequence 1802.

At step 906, the derived first length of execution indicator (corresponding to using the first processing unit 104'(1)) and the derived second length of execution indicator (corresponding to using the first processing unit 104'(2)) are processed to derive a performance improvement indicator conveying a level of improvement between using the second processor relative to using the first processor. In a very specific example, the performance improvement indicator (denoted by I) may be calculated using the following equation (10):

$$I=|(T2-T1)/T1|*100\%$$ (Equation 10)

Where I represents a specific example of the performance improvement indicator, which is an absolute value; T2 represents the second length of execution indicator associated with the second processor, which is the expected execution period for executing the instruction sequence using the second processor; T1 represents the first length of execution indicator associated with the first processor, which is the expected execution period for executing the instruction sequence using the first processor.

By applying the calculated T1 and T2 into the equation (10), and using the specific sequence shown in FIG. 18A as an example, I=|(100−131)/131|=23.66%. That means, compared with using the first processing unit 104'(1) including 16 multiplication units, using the second processing unit 104'(2) including 512 multiplication units, would result in 23.66% reduction in cycle numbers for the execution of the sequence shown in FIG. 18A.

At step 908, a specific processor may be selected amongst the first processor and the second processor at least in part based on the performance improvement indicator derived at step 906. In some specific practical examples of implementation, the selection may be made based on a comparison between the derived performance improvement indicator and a minimum performance improvement threshold. If the derived performance improvement indicator does not meet a minimum performance improvement threshold, the first processor (which has fewer multipliers and thus may be considered less costly than the second processor) is selected as the specific processor for executing the instruction sequence 1802. If the derived performance improvement indicator meets (or exceeds) the minimum performance improvement threshold, the second processor is selected as the specific processor for executing the instruction sequence 1802.

The minimum performance improvement threshold may be set to any specific suitable value and may be selected to reflect a balance between processing speed/time (e.g., minimizing the number of cycles) and hardware cost (minimizing the number of multipliers). Since multipliers are expensive, if the performance improvement obtained by using the more expensive processor (here the second processor) does not achieve a minimum improvement in performance, reflected by the minimum performance improvement threshold, it may be not worthwhile to select this more expensive processor.

In a first non-limiting example, the minimum performance improvement threshold may be pre-set to be 30%.

In the example above, the performance improvement indicator (denoted as I) derived by comparing T1 (corresponds to 16 multipliers) and T2 (corresponds to 512 multipliers) that are needed to execute the first instruction sequence 1802 equals to 23.66%, which is less than the pre-set value of 30% for the minimum performance improvement threshold. Thus, in this example, the controller 120' would select the first processing unit 104'(1) and send the first instruction sequence 1802 to the first instruction memory 114'(1) such that the first processing unit 104'(1) can execute the first instruction sequence 1802 from the first instruction memory 114'(1).

To further illustrate the above, another example of an instruction sequence, a second instruction sequence 1812, is presented in FIG. 18B. The second instruction sequence 1812 comprise 99 scalar matrix multiplication 1816(1)-1816(99) (generically referred to as scalar matrix multiplications 1816) and 1 Add operation 1814. In this second non-limiting example, one of the first processing unit 104'(1) (e.g., a 16-multiplier processor type) and the second processing unit 104'(2) (e.g., a 512-multiplier processor type) may be selected to execute the second instruction sequence 1812. Furthermore, the first and second input data elements applied to each scalar matrix multiplication 1816 are 8×8 scalar matrices.

As shown in FIG. 18B, the second instruction sequence 1812 comprises one Add operation, which will need 1 cycle (given one Add operation needs one single cycle (1 cycle) to be executed). Therefore, To1=To2=1 cycle.

For each scalar matrix multiplication 1816 as shown in FIG. 18B, 32 cycles of multiplication are needed for the 16-multiplier processor type to execute the scalar matrix multiplication 1816. Since the second instruction sequence includes 99 scalar matrix multiplications 1816, Tm1=99×32 cycles=3168 cycles. Based on the equation (8) and the calculated number of multiplication cycles for multiple scalar matrix multiplications 1816, T1=1+3168=3169 cycles. As such, it would take the first processing unit 104'(1) 3169 cycles to execute the instruction sequence 1812.

Similarly, for the second processing unit 104'(2) with 512-multiplier processor type, 1 cycle of multiplication is needed to execute the scalar matrix multiplication 1816. Since the second instruction sequence includes 99 scalar matrix multiplications 1816, Tm2=99×1 cycles=99 cycles. Based on the equation (9) and the calculated number of multiplication cycles for multiple scalar matrix multiplications 1816, T2=1+99=100 cycles. As such, it would take the second processing unit 104'(2) 100 cycles to execute the instruction sequence 1812.

By applying the calculated T1 and T2 into the equation (10), I=|(100−3169)/3169|*100%=96.84%. Compared with the first processing unit 104'(1) including 16 multiplication units, the expected execution period for executing the second instruction sequence 1802, by using the second processing unit 104'(2) including 512 multiplication units, is improved by 96.84%, which is far greater than the pre-set value of 30%. In that case, the second processing unit 104'(2) may be selected to execute the second instruction sequence 1802.

In particular, the controller 120' will select the second processing unit 104'(2) and send the second instruction sequence 1812 to the second instruction memory 114'(2) such that the second processing unit 104'(2) can execute the second instruction sequence 1812 from the second instruction memory 114'(2). Since the performance improvement indicator is greater than the pre-set value, that means that it worthwhile to select a processing unit including the more expensive multipliers.

Therefore, a selection among different processor types could be made based on a comparison of the performance improvement indicator and a minimum performance improvement threshold. Flexibility of the system may be improved significantly.

At step 910, the selected specific processor executes the instruction sequence.

In some applications, the minimum performance threshold may be a pre-set value established by the manufacturer of a system 100' based on the application in which the system 100' will be used. In alternative examples, the minimum performance threshold may be pre-configured, pre-defined by an operator or an administrator who manages the system 100'. For example, when the administrator is concerned about computational speed, the minimum performance threshold may be set (e.g., to be relatively low, such as 15%) so that a processor type that helps to reduce the number of cycles to execute the instruction sequence is always selected. When the hardware cost is the biggest challenge, the minimum performance threshold may be set (e.g., to be relatively high, such as 80%) so that a processor type that requires less multiplication units is selected to execute the instruction sequence. In other applications, an external input that defines the minimum performance threshold may be received by the system 100', in order to allow a user to have greater control on the selection of the processor.

It is understood that the first length of execution indicator (T1) and the second length of execution indicator (T2) are estimates, and data dependencies, memory latency, and other effects are not taken into account in the above examples for the purpose of simplicity. In other examples, each of the first length of execution indicator (T1) and the second length of execution indicator (T2) may include information related to lengths for at least one of the data dependencies, the memory latency, or other similar effects.

It is to be appreciated that one single cycle that is needed to execute one Add operation has been presented in the example of FIGS. 18A and 18B for the purpose of illustration only and that alternative implementations with a varied number of cycles (different than 1) needed to execute each Add operation may be contemplated.

It is also to be appreciated that although the above examples have focused on the use of a performance improvement indicator and a minimum performance improvement threshold as factor in the selection of a specific processor to execute an instruction sequence, it will be appreciated by the person skilled in the art that this is for the purpose of illustration. In alternative examples, the selection may be made based on the derived performance improvement indicator in combination with one or more other factors. In such alternative implementations, the one or more other factors may include, for example: a system load level, a power consumption level and latency requirements. The system load may define, for example, a number of "other" instruction sequences that may be required to be executed by the system (such as system 100' of FIG. 1B) and/or information pertaining to a complexity of these other instruction sequences. For example, if there are two instruction sequences to be executed in which a first instruction sequence is primarily comprised of additions and the second instruction sequence is primarily comprised of multiplications, the first instruction sequence may be executed by a processor with fewer multipliers to allow the second instruction sequence to proceed with a processor with more multipliers. In another example, if the system load shows only a single instruction sequence to be executed where the single instruction sequence is primarily comprised of additions but with a few multiplications instructions, a processor with more multipliers may nevertheless be selected to execute the single instruction sequence given the system load is light, even if the performance improvement may not be very high. It will be appreciated that the above are only specific examples and that many other factors may be taken into account in the selection of a specific processor for executing an instruction sequence, which will become apparent to the person skilled in the art in view of the present description.

The method 900 provides a method for executing an instruction sequence written using a common instruction library for a system including processors associated with different respective processor types among a family of processor types. Since the instruction sequence could be executed by processors of any processor type in the family, there is no need to add different respective processing instructions for different processor types. The method could be applied in different kinds of applications without changing software and/or hardware designs. Furthermore, a processor of any processor type could be selected to execute the common instruction sequence based on a comparison of the performance improvement indicator and a pre-set minimum performance threshold or other various performance requirements. It is noted that while two different processor types are disclosed in the examples of FIGS. 1B and 9, this is merely illustrative and is not intended to be limiting. By way of another non-limiting example, in one possible configuration, processors of three, four or more different processor types in the family of processor types may be present in the system 100', and the number of multiplication units for each processor type may vary depending on the specific implementation. That is, the processors of types in the family of processor types may include $2^M*N$ multiplication units (N is an integer $\geq 1$ and M is an integer $\geq 0$). Furthermore, N is a same value for all processor types in the family of processor types; and M is different for each processor type in the family of processor types.

Scalar/Complex Multiplication Types

As described above, the present disclosure presents a family of processors of different types configured for executing a common instruction set and a method for executing instructions from the common instruction set using a processor of any type from the family of processor. Of particular interest here are instructions from the common instruction set defining a multiplication of a certain type to be applied to a first input data element and a second input data element, wherein the multiplication type is one of a plurality of multiplication types. For example, the multiplication type may be one of: a scalar vector multiplication; a complex vector multiplication; a scalar matrix multiplication and a complex matrix multiplication. In the present section, an overview of the different multiplication types contemplated in the present disclosure will be described to that the reader may develop a better understanding of the subject matter. It is to be understand that the present disclosure is not intended to be exhaustive and that other approaches may be contemplated and will become apparent to the person skilled in the art in view of the present disclosure.

In this regard, FIGS. 10-12 present different multiplication types applied to first and second input data element in accordance with specific illustrative examples.

In particular, FIG. 10 illustrates a scalar vector multiplication 1000 of two 128-bit vectors (e.g., vector A and vector B). Each vector is in the form of an array of 16 8-bit values, where each 8-bit value is an integer. An output of multiplying vector A and vector B produces an array of 16 16-bit values, for a total of 256 bits. As can be seen in FIG. 10, the scalar vector multiplication 1000 applied to vector A and vector B (16 values each of which is 8-bit) requires 16 8-bit multiplication operations.

FIG. 11 shows a complex vector multiplication 1100 of two 128-bit vectors (e.g., vector A and vector B). Each vector is an array of 8 complex values, wherein each value includes an 8-bit real part and an 8-bit imaginary part. Taking vector A as an example, the vector A includes 8 complex values. A first complex value of vector A denoted by a dashed circle 1102(0) include AR0 and AI0. AR0 is the 8-bit real part and AI0 is the 8-bit imaginary part of the first complex value of vector A. Similarly, a first complex value of vector B denoted by a dashed circle 1104(0) includes BR0 and BI0. BR0 is the 8-bit real part and BI0 is the 8-bit imaginary part of the first complex value of vector B. When the first complex value 1102(0) is multiplied by the first complex value 1104(0), the resulting output would be AR0×BR0−AI0×BI0 and AR0×BR0+AI0×BI0. Thus, an output of multiplying vector A and vector B includes an array of 8 complex values, for a total of 256 bits. Each value comprises a 16-bit real value and a 16-bit imaginary value. Thus, the complex vector multiplication 1100 where the vector A and the vector B (8 complex values each with an 8-bit real part and an 8-bit imaginary part) are multiplied requires 32 8-bit multiplication operations.

FIG. 12 shows a scalar matrix multiplication 1200 of two 4×4 matrices of 8-bit values (e.g., vector A (matrix A) and vector B (matrix B)). Each matrix is a 4×4 matrix, in which each element is an 8-bit value. Each of the 8-bit values in matrix A and matrix B may be an integer. When the scalar multiplication operation is applied to matrix A and matrix B, each row of matrix A is multiplied by each column of matrix B. For each row/column combination, 4 multiplication operations are required. The output of multiplying vector A and vector B includes an array of 16 values, where each value requires 4 multiplication operations to be calculated, for a total of 4×16=64 multiplications. Thus, the scalar matrix multiplication 1200 applied to matrix A and matrix B (each is a 4×4 matrix) requires 64 8-bit multiplication operations.

FIG. 13 shows the different number of multiplication operations required for executing different types of multiplication operations applies to two input data elements of various dimensions ("Dims in the table"), comprised of 8-bit values. For example, take a scalar vector multiplication applied to two 128-bit vectors, each vector including 16 components each of which is an 8-bit value. Each vector can be interpreted as a 16×1 matrix (there is a single row or column in the matrix). Thus, 16 multiplication operations will be needed in total to implement the 128-bit scalar vector multiplication (interpreted as two 16 8-bit scalar vector multiplications). As shown in FIG. 13, an overall number of multiplication operations required to implement a multiplication depends on a specific type of the multiplication and a number of components (a.k.a. size) of each input data element.

FIG. 14 shows the different number of multiplication operations required for implementing different types of multiplication operations where components of each of two input data elements are 16-bit values, rather than the 8-bit values shown in FIG. 13. In that case, for a scalar vector multiplication applied to two 128-bit vectors, each vector would include 8 components each of which is a 16-bit value. Accordingly, 8 multipliers will be required in total to implement the 128-bit scalar vector multiplication.

Example of Family of Processors

Figure 15:
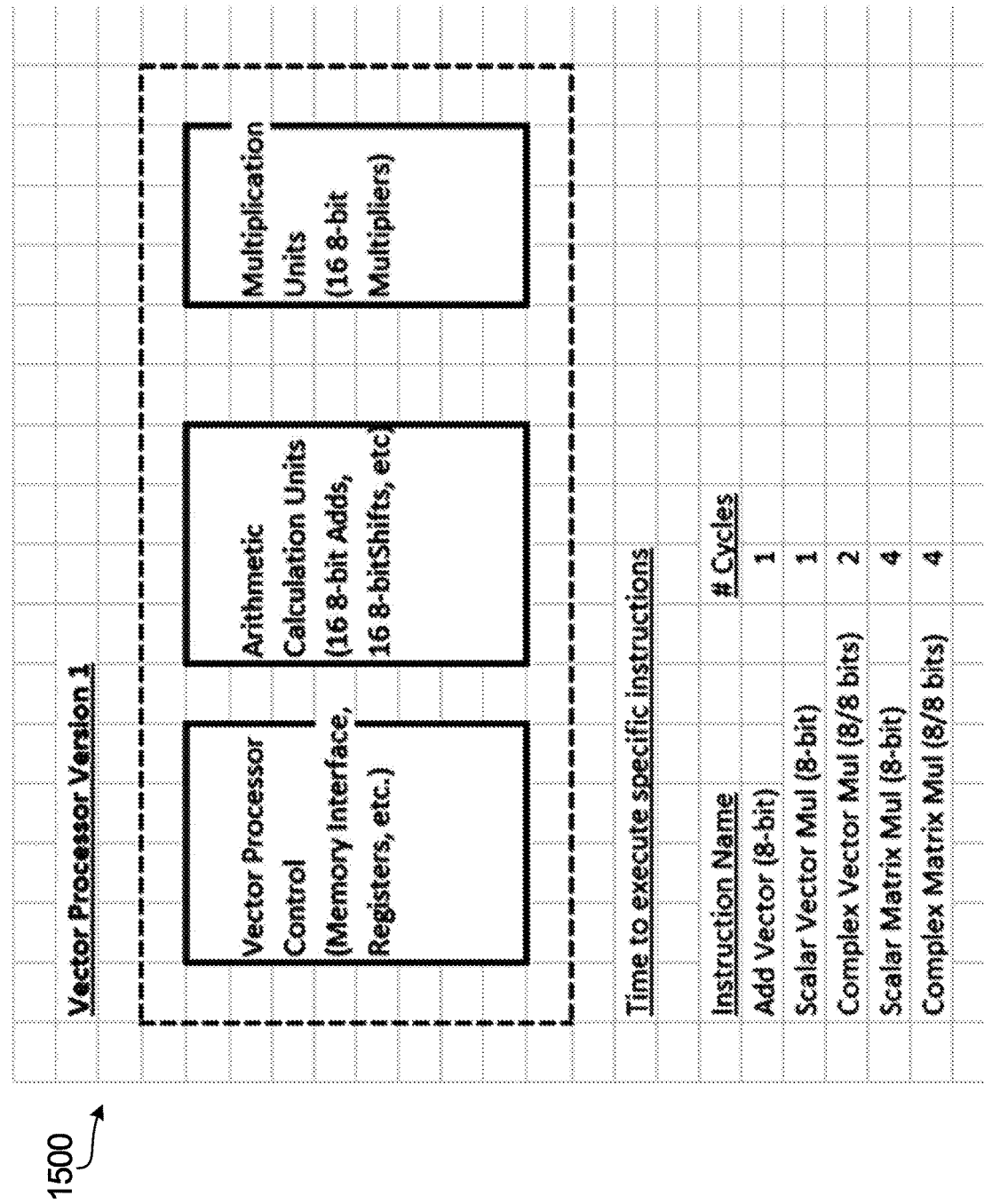
Figure 16:
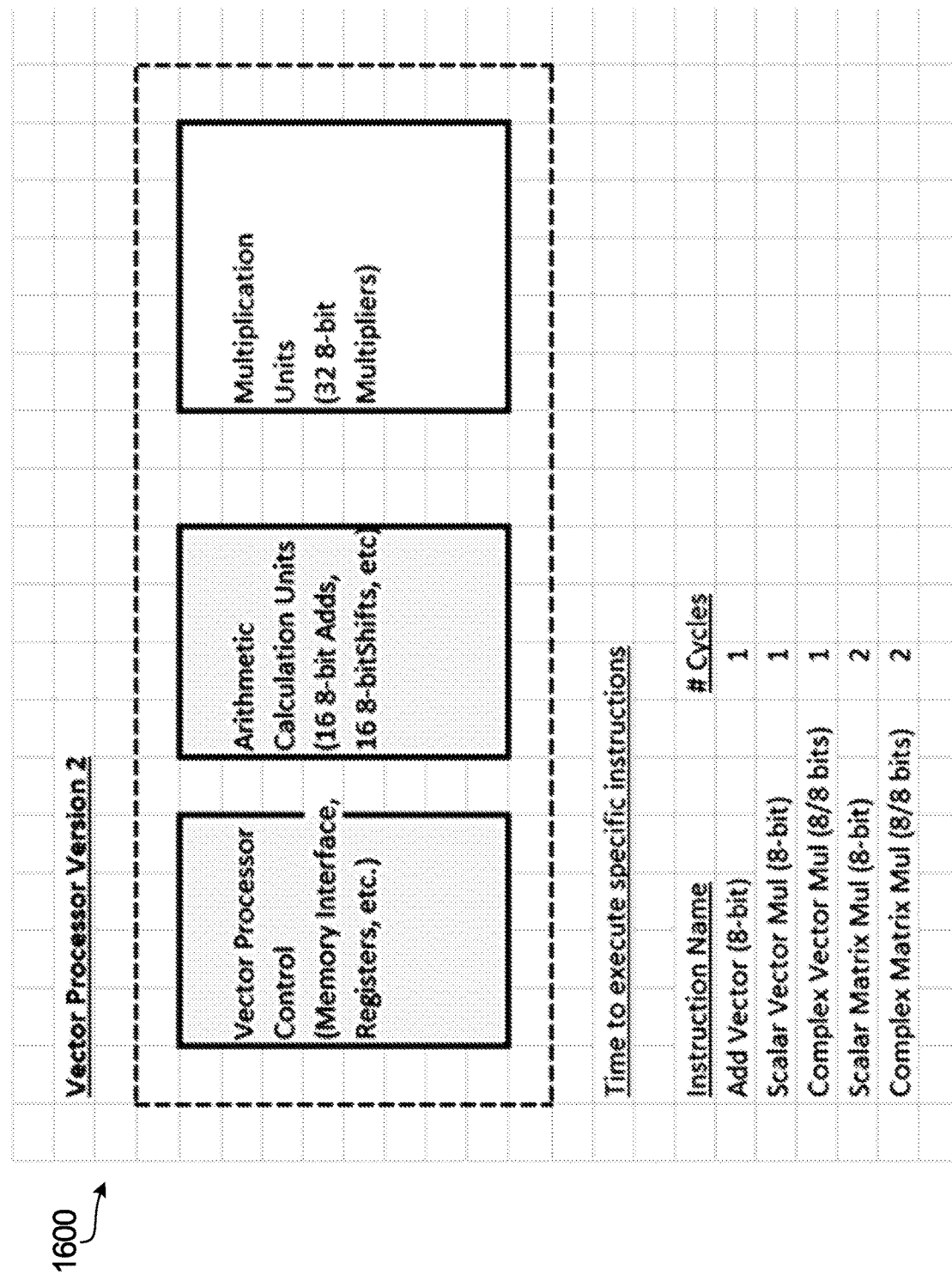
Figure 17:
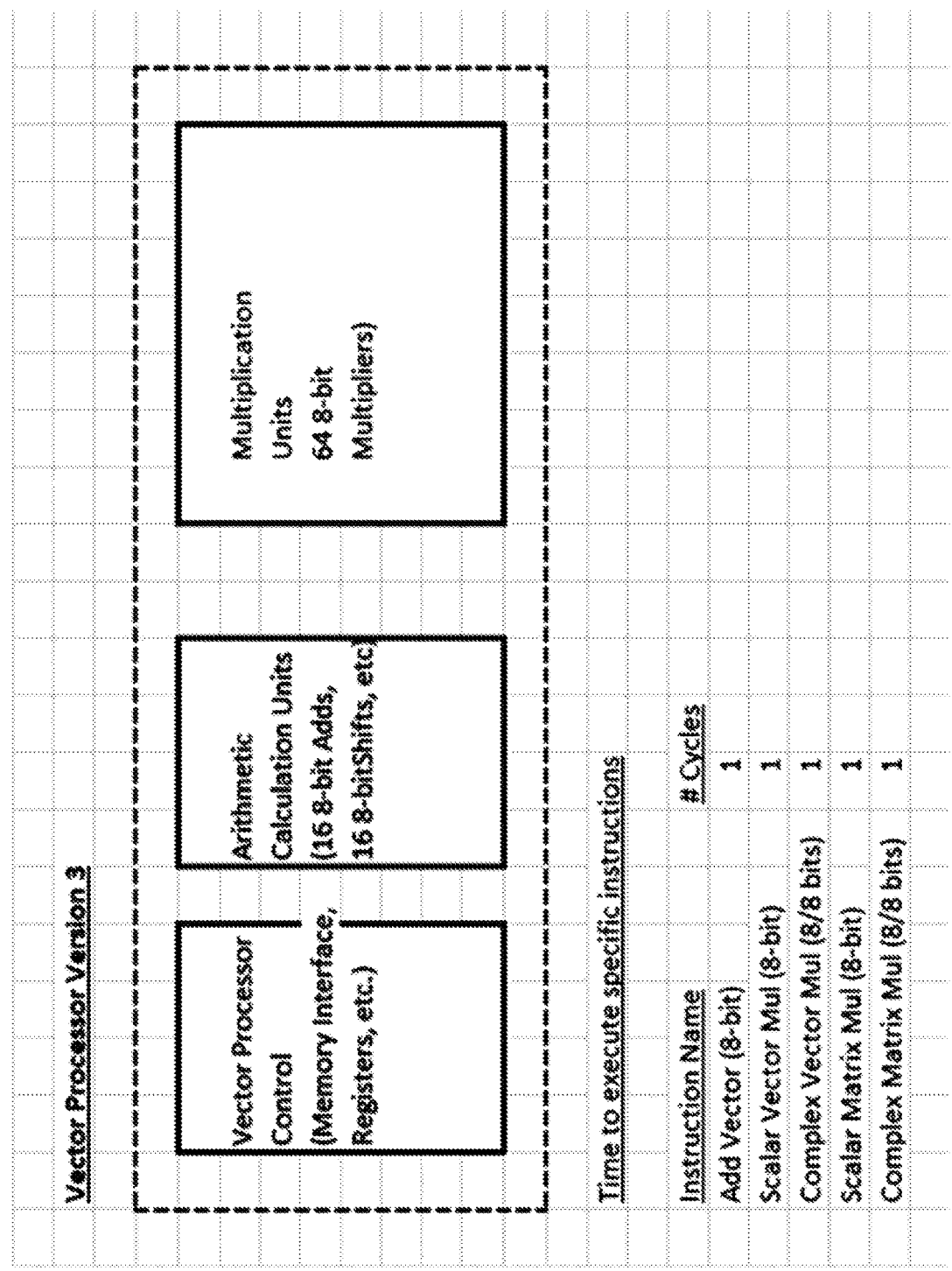

FIGS. 15, 16 and 17 are schematic diagrams of a family of processors including three (3) processor types 1500 1600 1700. FIG. 15 shows a processor of a first processor type having 16 8-bit multipliers; FIG. 16 shows a processor of a second processor type having 32 8-bit multipliers; and FIG. 17 shows a processor of a third processor type having 64 8-bit multipliers. The three (3) processor types 1500 1600 1700 shown in FIGS. 15, 16 and 17 are configured for executing a common instruction set in accordance with an embodiment of the invention. The common instruction set may include instructions of various types (e.g. including, without being limited to, addition/subtraction operations, division, shift left, shift right, rotate, scalar (vector or matrix) multiplications and complex (vector or matrix) multiplications). Of particular interest for the present disclosure are the multiplication operations.

Looking at FIG. 15 in greater detail, the processor type 1500, which for the purpose of this example will be considered to be a 16 8-bit-multiplier processor, includes 16 8-bit multipliers, 16 8-bit Add units and associated control circuitry/registers. Furthermore, in FIG. 15, respective numbers of multiplication cycles needed for executing specific types of multiplication instructions are presented. For example, as shown in FIG. 15, for two input data elements each is a vector of 16 8-bit scalar values: (a) 1 cycle would be needed to implement an Add ("Add Vector") operation; and (b) 1 multiplication cycle would be needed to perform a scalar vector multiplication, which requires 8 multiplications. In cases where the operation is a complex vector multiplication, 2 multiplication cycles are needed to implement the complex vector multiplication, which requires 32 multiplications with two 8 component 8-bit complex vector inputs. In cases where the operation is a scalar matrix multiplication, 4 multiplication cycles are needed to implement the scalar matrix multiplication, which requires 64 multiplications with two 4×4 8-bit matrix inputs. In cases where the operation is a complex matrix multiplication, 4 multiplication cycles are needed to implement the complex matrix multiplication, which requires 64 multiplications with a 4×2 complex 8-bit matrix input and a 2×4 complex 8-bit matrix input.

Looking now to FIG. 16, the processor type 1600 is similar to processor type 1500 except that it includes 32 8-bit multipliers rather than 16 8-bit multipliers. For the purpose of this example the processor type 1600 can therefor be considered to be a 32 8-bit-multiplier processor. Furthermore, in FIG. 16, respective numbers of multiplication cycles needed for executing specific types of multiplication instructions are presented. For example, as shown in FIG. 16, for two input data elements each is a vector of 16 8-bit scalar values, (a) 1 cycle would be needed to implement an Add ("Add Vector") operation; and (b) 1 multiplication cycle would be needed to perform a scalar vector multiplication, which requires 8 multiplications. In cases where the operation is a complex vector multiplication, 1 multiplication cycle is needed to implement the complex vector multiplication, which requires 32 multiplications with two 8 component 8-bit complex vector inputs. In cases where the operation is a scalar matrix multiplication, 2 multiplication cycles are needed to implement the scalar matrix multiplication, which requires 64 multiplications with two 4×4 8-bit matrix inputs. In cases where the operation is a complex matrix multiplication, 2 multiplication cycles are needed to implement the complex matrix multiplication, which requires 64 multiplications with a 4×2 complex 8-bit matrix input and a 2×4 complex 8-bit matrix input.

Looking now to FIG. 17, the processor type 1700 is similar to processor types 1500 and 1600 except that it includes 64 8-bit multipliers rather than 16 8-bit multipliers or 32 8-bit multipliers. For the purpose of this example the processor type 1700 can therefor be considered to be a 64 8-bit-multiplier processor. Furthermore, in FIG. 17, respective numbers of multiplication cycles needed for executing specific types of multiplication instructions are presented. For example, as shown in FIG. 17, for two input data elements each is a vector of 16 8-bit scalar values, (a) 1 cycle would be needed to implement an Add ("Add Vector") operation; and (b) 1 multiplication cycle would be needed to perform a scalar vector multiplication, which requires 8 multiplications. In cases where the operation is a complex vector multiplication, 1 multiplication cycle is needed to implement the complex vector multiplication, which requires 32 multiplications with two 8 component 8-bit complex vector inputs. In cases where the operation is a scalar matrix multiplication, 1 multiplication cycles are needed to implement the scalar matrix multiplication, which requires 64 multiplications with two 4×4 8-bit matrix inputs. In case where the operation is a complex matrix multiplication, 1 multiplication cycles are needed to implement the complex matrix multiplication, which requires 64 multiplications with a 4×2 complex 8-bit matrix input and a 2×4 complex 8-bit matrix input.

Comparing with the processor type 1500 1600 1700 in FIGS. 15-17, it can be seen that the number of multiplication cycles needed for executing specific instruction depends on the number of multipliers for a given processor type and the multiplication type (e.g. a scalar vector multiplication; a complex vector multiplication; a scalar matrix multiplication and a complex matrix multiplication). As an illustrative example, two input data elements (e.g., two 16 component 8-bit scalar vectors) may be provided as inputs for a scalar vector multiplication to each of the three different processor types shown in FIGS. 15-17. In such a case, 1 multiplication cycle would be needed for any one of the 16 8-bit-multiplier processor 1500, the 32 8-bit-multiplier processor 1600, and the 64 8-bit-multiplier processor 1700 to execute the scalar vector multiplication instruction because the number of multiplication units in total needed for a 16 8-bit scalar multiplication is 16. Thus, as long as the number of multipliers included in a processor is equal to or greater than 16, only 1 multiplication cycle is needed for the 16 8-bit multiplication. In some scenario where criteria define that less hardware cost (e.g., a minimum number of multipliers needed) is desired, the 16 8-bit-multiplier processor 1500 may be privileged in a selection process as the minimum number of multipliers needed for a processor to implement the 16 8-bit multiplication.

As another illustrative example, two input data elements (e.g., two 4×4 8-bit matrices) may be provided as inputs for a scalar matrix multiplication to each of the three different processor types shown in FIGS. 15-17. In such a case, 4 multiplication cycles would be needed by the 16 8-bit-multiplier processor 1500, 2 multiplication cycles would be needed by the 32 8-bit-multiplier processor 1600, and 1 multiplication cycle would be needed by the 64 8-bit-multiplier processor 1700 to execute the scalar matrix multiplication instruction because the number of multiplication units needed in total is 64. In a scenario where the selection criteria for the processor type is that of minimizing execution time (e.g., a minimum number of multiplication cycles), a processor type that provides the minimum number of multiplications cycles may be selected amongst the three processors 1500, 1600, 1700, which in this case would be processor type 1700 show in FIG. 17.

As another illustrative example, two input data elements (e.g., two 8 component 8-bit complex vector inputs) may be provided as inputs for a complex vector multiplication to each of the three different processor types shown in FIGS. 15-17. In such a case, 2 multiplication cycles would be needed by the 16 8-bit-multiplier processor 1500, 1 multiplication cycles would be needed by the 32 8-bit-multiplier processor 1600, and 1 multiplication cycle would be needed by the 64 8-bit-multiplier processor 1700 to execute the complex vector multiplication instruction because the number of multiplication units needed in total is 32.

In a scenario where the selection criteria for the processor type requires that a minimum time is desired to implement a specific multiplication (e.g., the complex vector multiplication), either one of the 32 8-bit-multiplier processor 1600 and the 64 8-bit-multiplier processor 1700 may be selected to perform the complex vector multiplication amongst the three processors 1500, 1600, 1700. In a scenario where the selection criteria for the processor type requires that a minimum time and a minimum number of multipliers are desired to implement a specific multiplication (e.g., the complex vector multiplication), the 32 8-bit-multiplier processor 1600 may be selected to perform the complex vector multiplication amongst the three processors 1500, 1600, 1700.

CONCLUSION

The present disclosure has presented examples of systems and methods which enable a processor of a specific type to be instruction-compatible with other processors from a family of processors of different types such a common instruction set can be used for all processors in the family of processors. In particular, for a specific instruction corresponding to a multiplication type, such instruction may be executed by a processor of any type in the family of processors without changing the specific instruction and/or the architecture of the processor. Furthermore, such an approach does not require customized instructions for each type of processor in the family of processors, the size of the entire instruction set can remain unchanged even if new processor types are added (or removed) from the family of processors.

In some implementations, a system may be provided with a plurality of processors associated with two or more different processor types each or which is configured to execute instructions from a common instruction set. The plurality of processors may include a first processor with a first processor type and a second processor with a second processor type. The first processor type corresponds to first cardinality information of the first processor, and the first processor type corresponds to second cardinality information of the second processor. The second cardinality information may be greater than the first cardinality information. A processor of a specific processor type may be selected amongst the first and second processor in such a system to execute an instruction sequence, the selection being based on one or more criteria designed to achieve specific objectives. Objective may include the performance improvement indicator of the system meeting a minimum performance improvement threshold that reflects certain performance requirements (e.g. speed of execution), power consumption levels, system load levels (e.g. other 'instruction sequences' that may need to be executed by the system), latency requirements, performance improvement requirements, and/or computational cost for the system. For example, a processor corresponding to a specific processor type satisfying the minimum performance improvement threshold to execute an instruction sequence may be selected to execute that instruction sequence. Accordingly, computation time for performing that instruction sequence may be lessened compared to using a different processor type. In alternative examples, a processor type that does not meet the minimum performance improvement threshold may not be selected to execute the specific instruction because such processor type may cause the system to consume too much hardware cost without reducing a significant amount of computation time.

It is to be appreciated that the selection of one or another processor may be instruction sequence dependent and be performed independently for each instruction sequence in the common instruction library. In such an implementation: a first instruction sequence composed of instructions in the common instructions set may be executed by a processor of a first processor type while a second instruction sequence composed of instructions from the common instruction set may be executed by a processor of a second processor type. Similarly, a third instruction sequence composed of instructions from the common instruction set may be executed by a processor of a third processor type and so on. By allowing the selection of a processor for each of the instruction sequences independently, the execution of the instruction sequences written using the common instruction set can be performed in a flexible manner by the system by choosing an optimal combination of processors that minimize computation time while minimizing computational costs for each instruction sequence, resulting in overcall improved system performance.

It should be appreciated that, although in most examples presented in the present application each component in the first and second input data elements to which a multiplication operation is to be applied is represented by 8 bits, this is only meant to be illustrative and is not intended to be limiting. In other examples, each element may be represented by any other appropriate number of bits and may have different configurations, such as a vector, 2D matrix or other. For example, each component of the inputs and/or outputs may be represented by 8 bits, 16 bits, 32 bits, 64 bits or any suitable bits in accordance with specific implementations.

Although the present disclosure describes methods and processes with steps in a certain order, one or more steps of the methods and processes may be omitted or altered as appropriate. One or more steps may take place in an order other than that in which they are described, as appropriate.

In some embodiments, any feature of any embodiment described herein may be used in combination with any feature of any other embodiment described herein.

Certain additional elements that may be needed for operation of certain embodiments have not been described or illustrated as they are assumed to be within the purview of those of ordinary skill in the art. Moreover, certain embodiments may be free of, may lack and/or may function without any element that is not specifically disclosed herein.

It will be understood by those of skill in the art that throughout the present specification, the term "a" used before a term encompasses embodiments containing one or more to what the term refers. It will also be understood by those of skill in the art that throughout the present specification, the term "comprising", which is synonymous with "including," "containing," or "characterized by," is inclusive or open-ended and does not exclude additional, un-recited elements or method steps. As used in the present disclosure, the terms "around", "about" or "approximately" shall generally mean within the error margin generally accepted in the art. Hence, numerical quantities given herein generally include such error margin such that the terms "around", "about" or "approximately" can be inferred if not expressly stated.

In describing embodiments, specific terminology has been resorted to for the sake of description, but this is not intended to be limited to the specific terms so selected, and it is understood that each specific term comprises all equivalents. In case of any discrepancy, inconsistency, or other difference between terms used herein and terms used in any document incorporated by reference herein, meanings of the terms used herein are to prevail and be used.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, certain technical solutions of the present disclosure may be embodied in the form of a software product. A suitable software product may be stored in a pre-recorded storage device or other similar non-volatile or non-transitory computer readable medium, for example. The software product includes instructions tangibly stored thereon that enable a processing device (e.g., a microprocessor) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

Although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

Although various embodiments of the disclosure have been described and illustrated, it will be apparent to those skilled in the art in light of the present description that numerous modifications and variations can be made. The scope of the invention is defined more particularly in the appended claims.

The invention claimed is:

1. A method for executing processing instructions by a processor of a specific processor type including a number of multiplication units and being configured for executing a common instruction set, the method comprising:
   a. receiving a specific instruction in the common instruction set, wherein the specific instruction defines a multiplication type to be applied to a first input data element and a second input data element, wherein the multiplication type is one of a plurality of multiplication types;
b. deriving a number of multiplication cycles for executing the specific instruction using the specific processor type at least in part by processing:
   a. cardinality information corresponding to the multiplication units for the specific processor type, and
   b. the multiplication type defined by the specific instruction;
c. executing the specific instruction using the processor of the specific processor type by repeatedly using the multiplication units of the processor of the specific processor type to perform multiplications for a number of cycles corresponding to the derived number of multiplication cycles.

2. The method as defined in claim 1, said method further comprising obtaining the cardinality information corresponding to the multiplication units for the specific processor type.

3. The method as defined in claim 1, wherein the deriving the number of multiplication cycles is performed at least in part by processing:
   a) the cardinality information of the multiplication units,
   b) the multiplication type,
   c) first size information corresponding to the first input data element, and
   d) second size information corresponding to the second input data element.

4. The method as defined in claim 3, wherein the specific instruction further defines the first size information and the second size information.

5. The method as defined in claim 3, wherein the multiplication type is one of: a scalar vector multiplication; a complex vector multiplication; a scalar matrix multiplication and a complex matrix multiplication.

6. The method as defined in claim 3, wherein:
   a) the first size information corresponding to the first input data element conveys a number of R1 rows and a number of C1 columns corresponding to the first input data element;
   b) the second size information corresponding to the second input data element conveys a number of R2 rows and a number of C2 columns corresponding to the second input data element, wherein the number of C1 columns equals the number of R2 rows (C1=R2); and
   c) wherein R1, C1, R2 and C2 are integers ≥1.

7. The method as defined in claim 6, wherein the multiplication type is one of a scalar vector multiplication and a scalar matrix multiplication, and wherein deriving the number of multiplication cycles is performed at least in part by dividing:
   a) a result of multiplying the number of R1 rows, the number of C1 columns, and the number of C2 columns; by
   b) the cardinality information of the multiplication units.

8. The method as defined in claim 6, wherein the multiplication type is one of a complex vector multiplication and a complex matrix multiplication and wherein deriving the number of multiplication cycles is performed at least in part by dividing:
   a) a result of multiplying 4, the number of R1 rows, the number of C1 columns, and the number of C2 columns (4*R1*C1*C2); by
   b) the cardinality information of the multiplication units.

9. The method as defined in claim 7, wherein the multiplication type is the scalar vector multiplication, wherein each of the first input data element and the second input data element is a scalar vector and wherein:
   a) the number of R1 rows is an integer >1;
   b) the number of C1 columns is equal to >1; and
   c) the number of C2 columns is an integer >1.

10. The method as defined in claim 7, wherein the multiplication type is the scalar vector multiplication, wherein each of the first input data element and the second input data element is a scalar vector and wherein:
    a) the number of R1 rows is equal to >1;
    b) the number of C1 columns is an integer >1; and
    c) the number of C2 columns is equal to >1.

11. The method as defined in claim 7, wherein the multiplication type is the scalar matrix multiplication, wherein each of the first input data element and the second input data element is a scalar matrix and wherein:
    a) the number of R1 rows is an integer >1;
    b) the number of C1 columns is an integer >1; and
    c) the number of C2 columns is an integer >1.

12. The method as defined in claim 8, wherein the multiplication type is the complex vector multiplication, wherein each of the first input data element and the second input data element is a complex vector and wherein:
    a) the number of R1 rows is an integer >1;
    b) the number of C1 columns is equal to 1; and
    c) the number of C2 columns is an integer >1.

13. The method as defined in claim 8, wherein the multiplication type is the complex vector multiplication, wherein each of the first input data element and the second input data element is a complex vector and wherein:
    a) the number of R1 rows is equal to 1;
    b) the number of C1 columns is an integer >1; and
    c) the number of C2 columns is equal to 1.

14. The method as defined in claim 8, wherein the multiplication type is the complex matrix multiplication, wherein each of the first input data element and the second input data element is a complex matrix and wherein:
    a) the number of R1 rows is an integer >1;
    b) the number of C1 columns is an integer >1; and
    c) the number of C2 columns is an integer >1.

15. The method as defined in claim 1, wherein the processor of the specific processor type is part of a family of processor types each of which includes a different number of multiplication units, wherein processors associated with the family of processor types are configured for executing the common instruction set.

16. The method as defined in claim 15, wherein the processors associated with the family of processor types are digital signal processors (DSPs).

17. The method as defined in claim 15, wherein the processors associated with the family of processor types include $2^M*N$ multiplication units, wherein N is an integer ≥1 and M is an integer ≥0 and wherein:
    a) N is a same value for all processor types in the family of processor types; and
    b) M is different for each processor type in the family of processor types.

18. A system comprising a processor of a specific processor type selected from a family of processor types each of which includes a different number of multiplication units, wherein processors associated with the family of processor types are configured for executing a common instruction set, the processor of the system being of a first processor type and the family of processor types including at least a second processor type distinct from the first processor type, the processor of the system comprising:

1. A first arithmetic calculation unit sharing a common design with arithmetic calculation unit in processors corresponding to other processor types in the family of processor types;
b) a first processing control circuitry sharing a common design with processing control circuitry in processors corresponding to other processor types in the family of processor types;
c) a first set of multiplication units, wherein a cardinality of the first set of multiplication units is different than cardinalities of sets of multiplication units of processors corresponding to other processor types in the family of processor types;
d) wherein the first processor is configured to be execute a specific instruction in the common instruction set which defines a multiplication type to be applied to a first input data element and a second input data element at least in part by executing the specific instruction including repeatedly using the first set of multiplication units to perform multiplications for a number of multiplication cycles, the number of multiplication cycles being derived at least in part by processing:
  ii. the cardinality information of the first set of multiplication units, and
  iii. the multiplication type defined by the specific instruction.

19. The system as defined in claim 18, wherein the cardinality of the first set of multiplication units is N and the cardinality of another set of multiplication units corresponding to the processor types in the family of processor types is $2^M*N$, wherein N and M are integers $\geq 1$.

20. The system as defined in claim 18, wherein the processor of the first specific processor type is a first processor, said system comprising a plurality of processors each of which is associated with a respective processor type selected from the family of processor types, the plurality of plurality of processors including the first processor and at least a second processor of a second processor type, the first processor type being different from the second processor type.

21. A set of processors corresponding to two or more different processor types in a family of processor types, the different processor types in said family of processor types including different numbers of multiplication units, wherein the processors in the set of processors are configured for executing a common instruction set including a plurality of multiplication types, wherein using a specific processor in the set of processors to execute a specific instruction from the common instruction set defining a multiplication type includes using multiplication units corresponding to the specific processor to perform multiplications for a number of cycles corresponding to a number of multiplication cycles, wherein the number of multiplication cycles is derived at least in part by processing cardinality information of the multiplication units of the specific processor and the multiplication type defined by the specific instruction.

22. A non-transitory computer-readable medium having instructions tangibly stored thereon, wherein the instructions are written using an instruction set configured to be executed by a processor of a specific processor type, when executed, said instructions causing the processor to implement the method defined in claim 1.

23. A system comprising a processor configured to execute a specific instruction in a common instruction set which defines a multiplication type to be applied to a first input data element and a second input data element at least in part by executing the specific instruction including repeatedly using a set of multiplication units to perform multiplications for a number of multiplication cycles, the number of multiplication cycles being derived at least in part by processing:
  i. cardinality information of the set of multiplication units, and
  ii. the multiplication type defined by the specific instruction.

* * * * *